(12) United States Patent
Sugawara

(10) Patent No.: US 11,595,553 B2
(45) Date of Patent: Feb. 28, 2023

(54) CAMERA MODULE INCLUDING AN AUTO-FOCUSING AND SHAKE-CORRECTING LENS DRIVING DEVICE, CAMERA MOUNTING APPARATUS AND CALIBRATION METHOD FOR CAMERA MODULE

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 613 days.

(21) Appl. No.: 16/697,421

(22) Filed: Nov. 27, 2019

(65) Prior Publication Data

US 2020/0174219 A1 Jun. 4, 2020

(30) Foreign Application Priority Data

Nov. 29, 2018 (JP) .............................. JP2018-223704

(51) Int. Cl.
*H04N 5/225* (2006.01)
*G02B 7/09* (2021.01)
(Continued)

(52) U.S. Cl.
CPC ............. *H04N 5/2253* (2013.01); *G02B 7/09* (2013.01); *G02B 27/646* (2013.01); *G03B 3/10* (2013.01);
(Continued)

(58) Field of Classification Search
CPC ............. H04N 5/2253; H04N 5/23212; H04N 5/23287; H04N 5/23258; G02B 7/09;
(Continued)

(56) References Cited

U.S. PATENT DOCUMENTS 7,881,598 B1 * 2/2011 Wu .......................... G03B 3/10
396/55
10,021,280 B2 * 7/2018 Sharma ............... H04N 5/23287
(Continued)

FOREIGN PATENT DOCUMENTS

CN 107343139 A 11/2017
EP 2816403 A1 12/2014
(Continued)

OTHER PUBLICATIONS

Extended European Search Report dated Apr. 3, 2020. Application No. 19212128.3-1020.

*Primary Examiner* — Luong T Nguyen
(74) *Attorney, Agent, or Firm* — Brundidge & Stanger, P.C.

(57) ABSTRACT

A camera module comprises: an AF driving part, a shake-correcting driving part, a first position detection part, a second position detection part, and a drive control part configured to perform driving control of the AF driving part based on detection results of the first position detection part and the second position detection part. The drive control part includes a correction part configured to correct the position of the AF movable part in the optical axis direction that is calculated based on the detection result of the first position detection part in accordance with preliminarily set correction data. The correction part corrects the detection result of the first position detection part in consideration of displacement of the AF movable part in the optical axis direction due to sway of the shake correction movable part.

9 Claims, 19 Drawing Sheets

(51) Int. Cl.
  *G02B 27/64* (2006.01)
  *G03B 3/10* (2021.01)
  *G03B 5/02* (2021.01)
  *H04N 5/232* (2006.01)
  *B60R 11/04* (2006.01)
  *B60R 11/00* (2006.01)

(52) U.S. Cl.
  CPC ........... *G03B 5/02* (2013.01); *H04N 5/23212* (2013.01); *H04N 5/23287* (2013.01); *B60R 11/04* (2013.01); *B60R 2011/004* (2013.01); *B60R 2011/0026* (2013.01); *B60R 2011/0043* (2013.01); *G03B 2205/0069* (2013.01)

(58) Field of Classification Search
  CPC ......... G02B 27/646; G03B 3/10; G03B 5/02; G03B 13/36; G03B 2205/0007; B60R 11/04; B60R 2011/004; B60R 2011/0043
  See application file for complete search history.

(56) References Cited

U.S. PATENT DOCUMENTS

| | | | |
|---|---|---|---|
| 2015/0015729 A1 | 1/2015 | Kasamatsu | |
| 2015/0103195 A1* | 4/2015 | Kwon | G03B 3/10 |
| | | | 348/208.12 |
| 2016/0025995 A1* | 1/2016 | Ariji | G02B 7/09 |
| | | | 359/557 |
| 2017/0115466 A1 | 4/2017 | Murakami et al. | |
| 2017/0322476 A1* | 11/2017 | Bai | G03B 3/10 |
| 2019/0339542 A1 | 1/2019 | Inada | |

FOREIGN PATENT DOCUMENTS

| | | |
|---|---|---|
| JP | 2015194660 A | 11/2015 |
| JP | 2016-066090 A | 4/2016 |
| KR | 20160052880 A | 5/2016 |
| WO | 2016/006168 A1 | 1/2016 |
| WO | 2018100646 A1 | 6/2018 |
| WO | 2018/234573 A1 | 12/2018 |

* cited by examiner

CAMERA MODULE INCLUDING AN AUTO-FOCUSING AND SHAKE-CORRECTING LENS DRIVING DEVICE, CAMERA MOUNTING APPARATUS AND CALIBRATION METHOD FOR CAMERA MODULE

CROSS REFERENCE TO RELATED APPLICATION

This application is entitled to the benefit of Japanese Patent Application No. 2018-223704, filed on Nov. 29, 2018, the disclosure of which including the specification, drawings and abstract is incorporated herein by reference in its entirety.

TECHNICAL FIELD

The present invention relates to a camera module including an auto-focusing and shake-correcting lens driving device, a camera mounting apparatus and a calibration method for a camera module.

BACKGROUND ART

In general, a small-sized camera module is mounted in a mobile terminal such as a smartphone. In such a camera module, a lens driving device is employed. The lens driving device has an auto-focusing function (hereinafter referred to as "AF (Auto Focus) function") of automatically performing focusing for capturing a subject, and a shake-correcting function (hereinafter referred to as "OIS (Optical Image Stabilization) function") of optically correcting shake (vibration) in image-capturing so as to reduce the variations in the image.

The auto-focusing and shake-correcting lens driving device includes an auto-focusing driving part (hereinafter referred to as "AF driving part") for moving the lens part in the optical axis direction, and a shake-correcting driving part (hereinafter referred to as "OIS driving part") for swaying the lens part in a plane orthogonal to the optical axis direction. In WO2016/006168 (PTL 1), a voice coil motor (VCM) is applied for the AF driving part and the OIS driving part.

The AF driving part of the VCM driving system includes, for example, an auto-focusing coil (hereinafter referred to as "AF coil") disposed at the periphery of the lens part, and an auto-focusing magnet (hereinafter referred to as "AF magnet") disposed away from the AF coil in the radial direction. An auto focus movable part (hereinafter referred to as "AF movable part") including the lens part and the AF coil is supported away from an auto focus fixing part (hereinafter referred to as "AF fixing part") including the AF magnet in the radial direction by an auto-focusing supporting part (hereinafter referred to as "AF supporting part", which is a leaf spring). Automatic focusing is performed by moving the AF movable part in the optical axis direction by using the driving force of the voice coil motor composed of the AF coil and the AF magnet. Here, the "radial direction" is orthogonal to the optical axis.

The OIS driving part of the VCM driving system includes, for example, a shake-correcting magnet (hereinafter referred to as "OIS magnet") disposed in the AF driving part, and a shake-correcting coil (hereinafter referred to as "OIS coil") disposed away from the OIS magnet in the optical axis direction. A shake correction movable part (hereinafter referred to as "OIS movable part") including the AF driving part and the OIS magnet is supported away from a shake correction fixing part (hereinafter referred to as "OIS fixing part") including the OIS coil in the optical axis direction by a shake-correcting supporting member (hereinafter referred to as "OIS supporting member", which is a suspension wire, for example). Shake correction is performed by swaying the OIS movable part in a plane orthogonal to the optical axis direction by using the driving force of the voice coil motor composed of the OIS magnet and the OIS coil.

In recent years, an AF driving part including a position detection part for detecting the position of the AF movable part in the optical axis direction is proposed (see, for example, PTL 1). A Hall device for detecting variation in magnetic field by using Hall effect is used as the position detection part, for example. Focusing can be correctly performed in a short time by controlling the energization current of the AF coil through feedback of the detection result of position detection part, and thus the reliability of the AF driving part is improved. In the lens driving device disclosed in PTL 1, the position detecting magnet is disposed in the AF movable part and the Hall device is disposed in the AF fixing part.

CITATION LIST

Patent Literature

PTL1
WO2016/006168

SUMMARY OF INVENTION

Technical Problem

Conventionally, the feedback-control based on the detection result of the position detection part is performed by an external control part (e.g., a camera module). As such, in the case where the position detection part is provided in the AF driving part, not only the feeding path for the AF coil, but also the feeding path and the signal path of the Hall device is required between the OIS movable part and the OIS fixing part. In the case where the suspension wire that is the OIS supporting part is used as the feeding path and the signal path of the Hall device, two pairs of suspension wires are required. In other words, six suspension wires, i.e., three pairs of wires, including the pair for the feeding path of the AF coil, are required as the configuration of the OIS supporting part. When the number of suspension wires increases, the man hours for assembly increases, and the behavior during shake correction is affected, and consequently, design is complicated. The same applies to any configuration of the OIS supporting part.

An object of the present invention is to provide a camera module, a camera mounting apparatus and a calibration method for a camera module capable of simplifying a configuration for detecting the position of an AF movable part in the optical axis direction while ensuring the position detection accuracy.

Solution to Problem

A camera module according to the present invention includes: an auto-focusing driving part including an auto focus movable part in which a lens part is disposed, and an auto focus fixing part disposed away from the auto focus movable part, the auto-focusing driving part being configured to move the auto focus movable part with respect to the auto focus fixing part in an optical axis direction; a shake-correcting driving part including a shake correction movable part and a shake correction fixing part disposed away from the shake correction movable part, the shake correction movable part including the auto focus movable part and the auto focus fixing part, the shake-correcting driving part being configured to sway the shake correction movable part with respect to the shake correction fixing part in an optical axis orthogonal plane orthogonal to the optical axis direction; a first position detection part including a position detection magnet disposed in the auto focus movable part, and a Hall device disposed opposite the position detection magnet in the optical axis direction in the shake correction fixing part, the first position detection part being configured to detect a position of the auto focus movable part in the optical axis direction; a second position detection part configured to detect a position of the shake correction movable part in the optical axis orthogonal plane; and a drive control part configured to perform driving control of the auto-focusing driving part on a basis of a detection result of the first position detection part and a detection result of the second position detection part. the drive control part includes a correction part configured to correct, in accordance with preliminarily set correction data, the position of the auto focus movable part in the optical axis direction that is calculated based on the detection result of the first position detection part. the correction part corrects the detection result of the first position detection part in consideration of a displacement of the auto focus movable part in the optical axis direction due to sway of the shake correction movable part.

A camera mounting apparatus according to the present invention is an information apparatus or a transport apparatus, the camera mounting apparatus including: the camera module according; and an image processing part configured to process image information obtained by the camera module.

A calibration method according to the present invention is a method for a camera module, the camera module including: an auto-focusing driving part including an auto focus movable part in which a lens part is disposed, and an auto focus fixing part disposed away from the auto focus movable part, the auto-focusing driving part being configured to move the auto focus movable part with respect to the auto focus fixing part in an optical axis direction; a shake-correcting driving part including a shake correction movable part and a shake correction fixing part disposed away from the shake correction movable part, the shake correction movable part including the auto focus movable part and the auto focus fixing part, the shake-correcting driving part being configured to sway the shake correction movable part with respect to the shake correction fixing part in an optical axis orthogonal plane orthogonal to the optical axis direction; a first position detection part including a position detection magnet disposed in the auto focus movable part, and a Hall device disposed opposite the position detection magnet in the optical axis direction in the shake correction fixing part, the first position detection part being configured to detect a position of the auto focus movable part in the optical axis direction; a second position detection part configured to detect a position of the shake correction movable part in the optical axis orthogonal plane; and a drive control part configured to perform driving control of the auto-focusing driving part on a basis of a detection result of the first position detection part and a detection result of the second position detection part, the method including: measuring the position of the auto focus movable part in the optical axis direction when the shake correction movable part is swayed in the optical axis orthogonal plane and associating a result of the measuring with the detection result of the first position detection part, and generating correction data for correcting the detection result of the first position detection part in consideration of a displacement of the auto focus movable part in the optical axis direction due to sway of the shake correction movable part on a basis of a relationship between the result of the measuring and the detection result of the first position detection part.

Advantageous Effects of Invention

According to the present invention, it is possible to simplify the configuration for detecting the position of the AF movable part in the optical axis direction while ensuring the position detection accuracy.

DESCRIPTION OF EMBODIMENTS

An embodiment of the present invention is described in detail below with reference to the drawings.

Figure 1A:
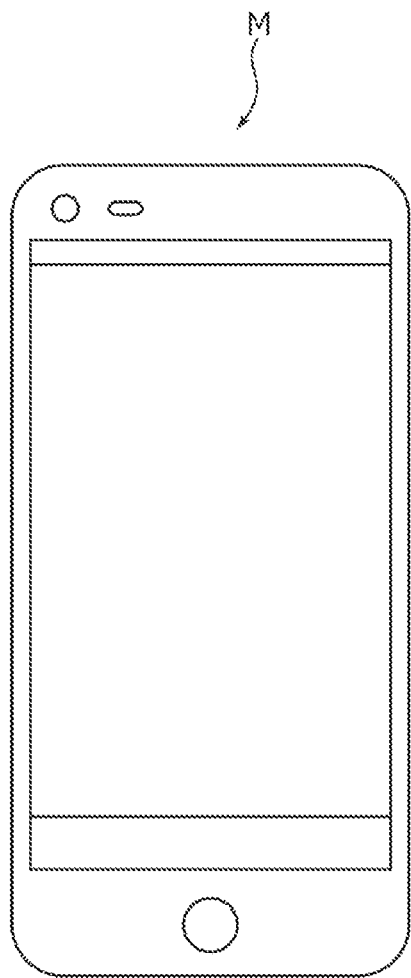
FIG. 1A and FIG. 1B illustrate a smartphone in which a camera module according to an embodiment of the present invention is mounted.
Figure 1B:
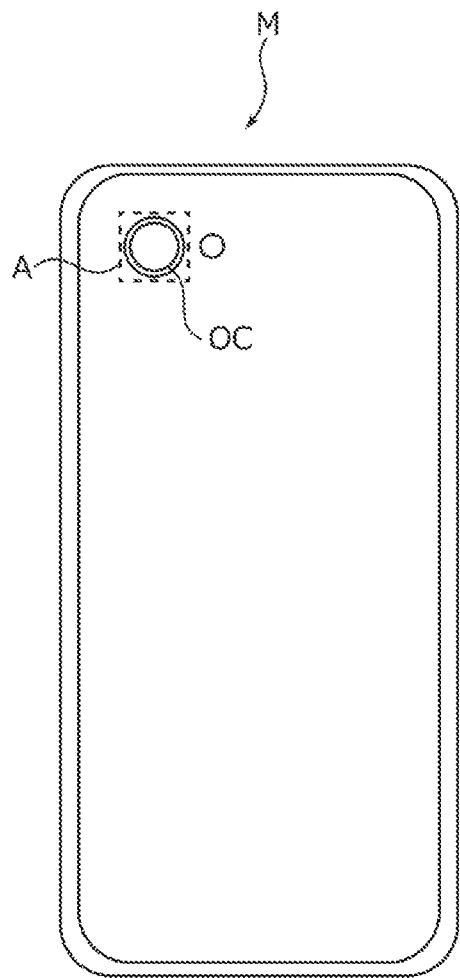

FIG. 1A and FIG. 1B illustrate smartphone M (camera mounting device) in which camera module A according to the embodiment of the present invention is mounted. FIG. 1A is a front view of smartphone M, and FIG. 1B is a rear view of smartphone M.

Smartphone M is provided with camera module A, for example, as back side camera OC. Camera module A has an AF function and an OIS function, and can capture an image without image blurring by automatically performing focusing at the time of capturing a subject, and by optically correcting shake (vibration) at the time of capturing an image.

Figure 2:
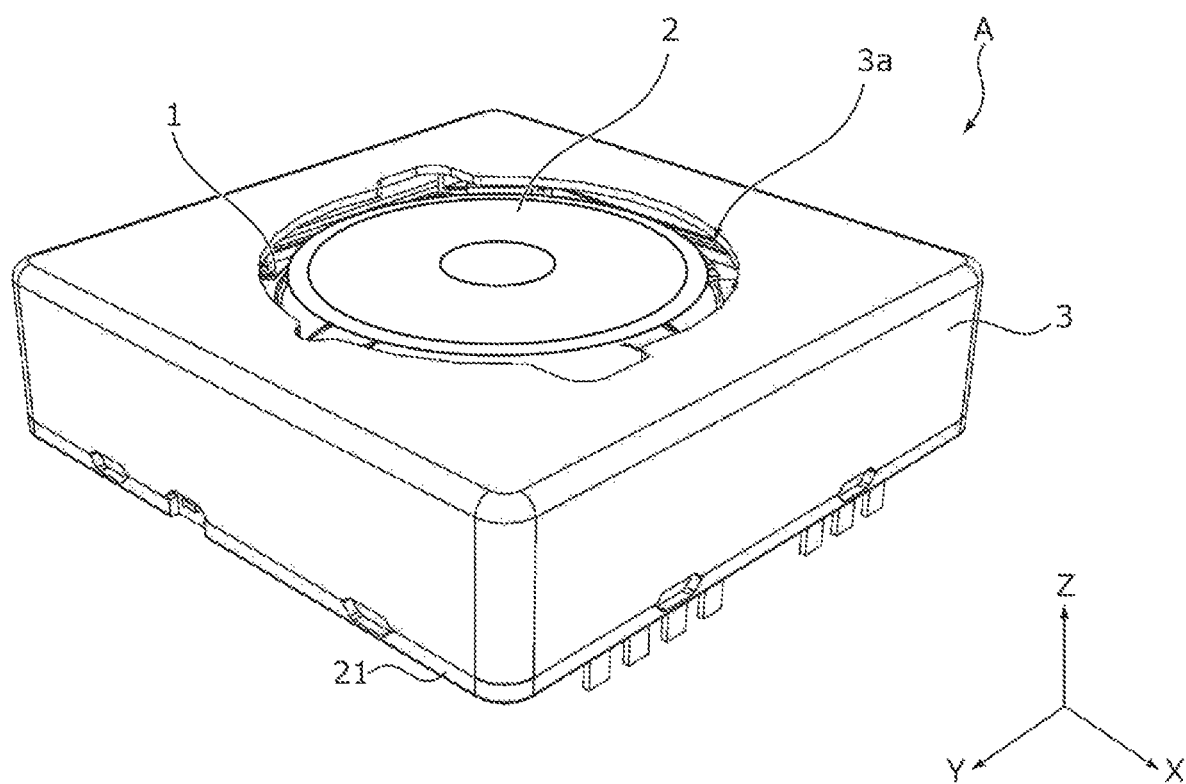
FIG. 2 is a perspective view illustrating an external appearance of the camera module.

FIG. 2 is a perspective view of an external appearance of camera module A.

As illustrated in FIG. 2, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the optical axis direction, the upper side in the drawing is the light reception side in the optical axis direction (also referred to as "macro position side"), and the lower side is the image capturing side in the optical axis direction (also referred to as "infinity position side"). In addition, the X direction and the Y direction orthogonal to the Z axis are referred to as "direction orthogonal to optical axis". Further, the directions obtained by rotating the X direction and the Y direction by 45° in the XY plane are "diagonal directions".

Camera module A includes lens driving device 1 that achieves the AF function and the OIS function, lens part 2 that includes a lens housed in a cylindrical lens barrel, an image capturing part (not illustrated) that captures a subject image imaged by lens part 2, and cover 3 that covers the entirety and the like.

In plan view as viewed from the light reception side in the optical axis direction, cover 3 is a capped rectangular cylinder member having a square shape, and has circular opening 3a in the top surface. Lens part 2 is exposed to the outside through opening 3a. Cover 3 is fixed to base 21 of lens driving device 1 by bonding, for example.

The image capturing part is disposed on the imaging side of lens driving device 1 in the optical axis direction. The image capturing part (not illustrated) includes an image sensor substrate (not illustrated) and an imaging device mounted on the image sensor substrate (not illustrated), for example. The imaging device is composed of a CCD (charge-coupled device) image sensor, a CMOS (complementary metal oxide semiconductor) image sensor or the like, for example. The imaging device captures a subject image imaged by a lens part (not illustrated), for example.

A control part that performs driving control of lens driving device 1 may be provided in the image sensor substrate, or in a camera-mounting apparatus (in the present embodiment, smartphone M) in which camera module A is mounted.

Figure 3A:
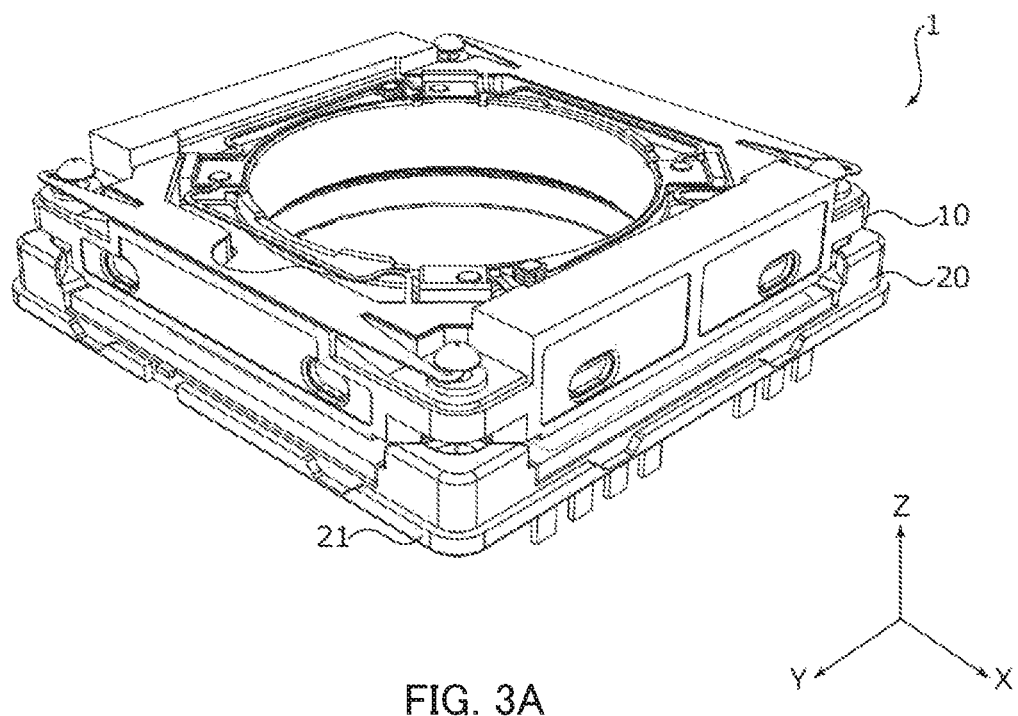
FIG. 3A and FIG. 3B are perspective views illustrating an external appearance of a lens driving device.
Figure 3B:
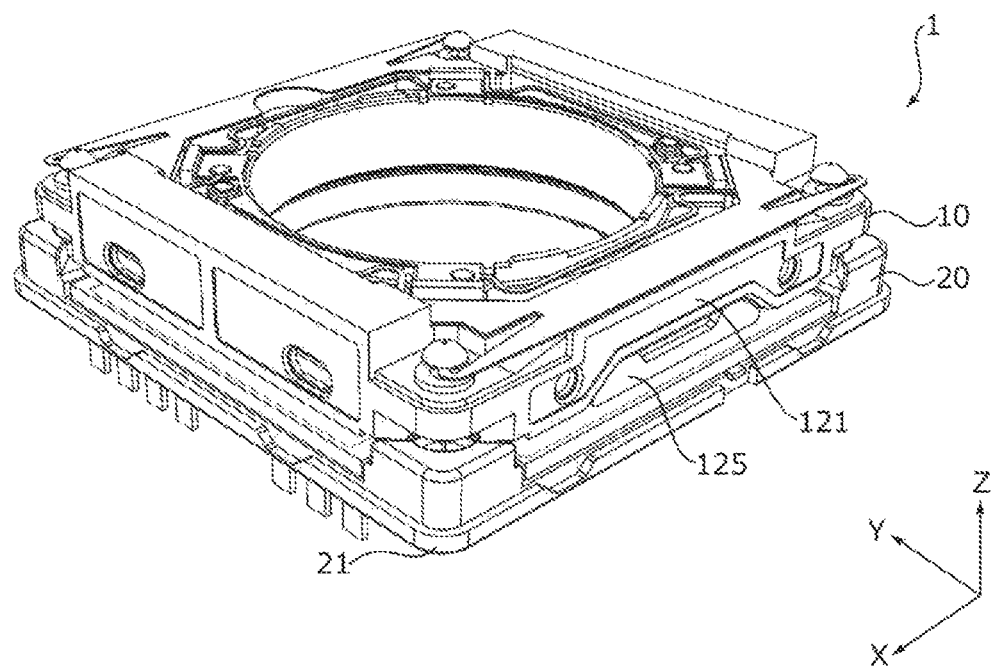
Figure 4:
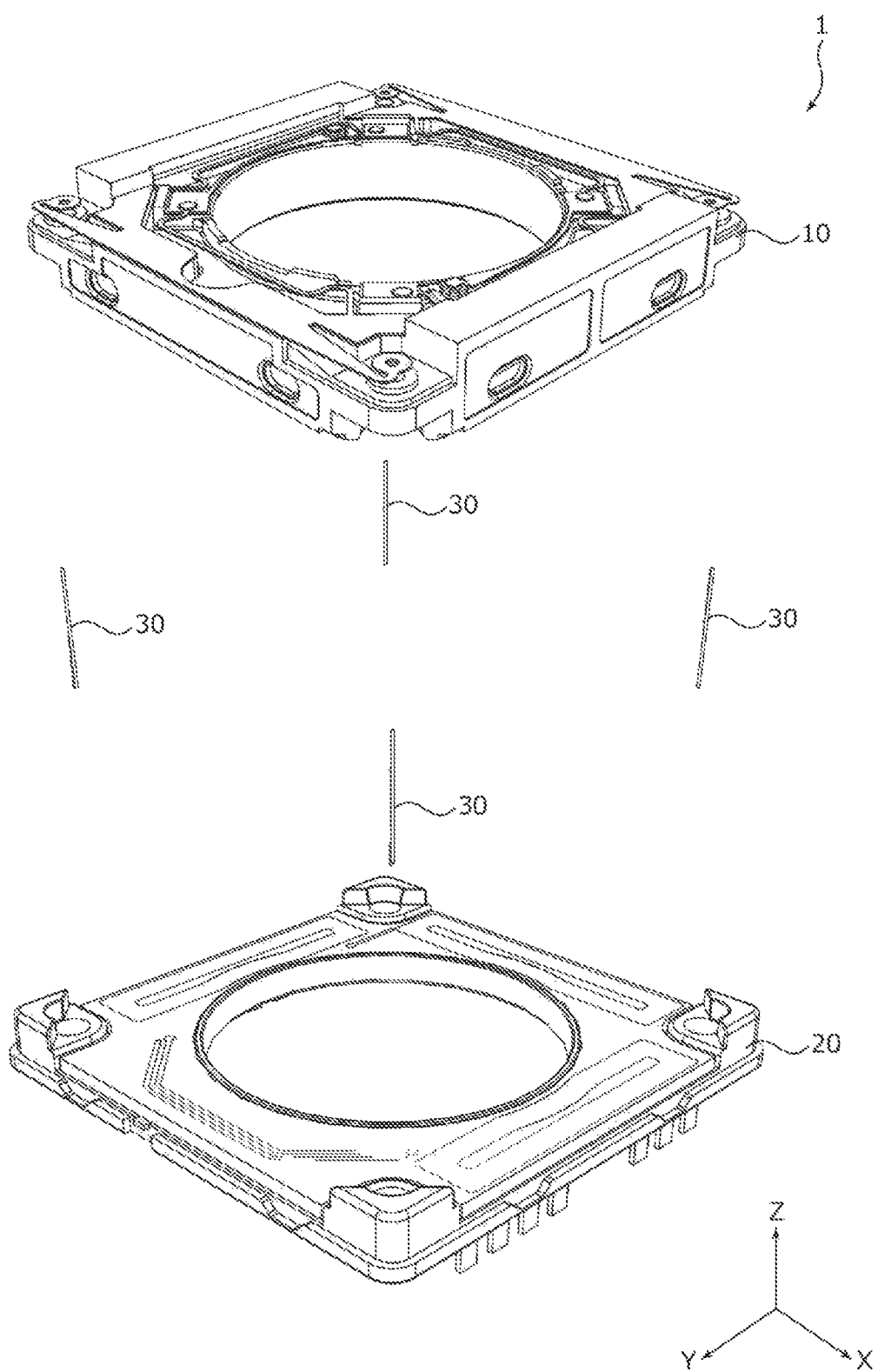
FIG. 4 is an exploded perspective view of the lens driving device.
Figure 5:
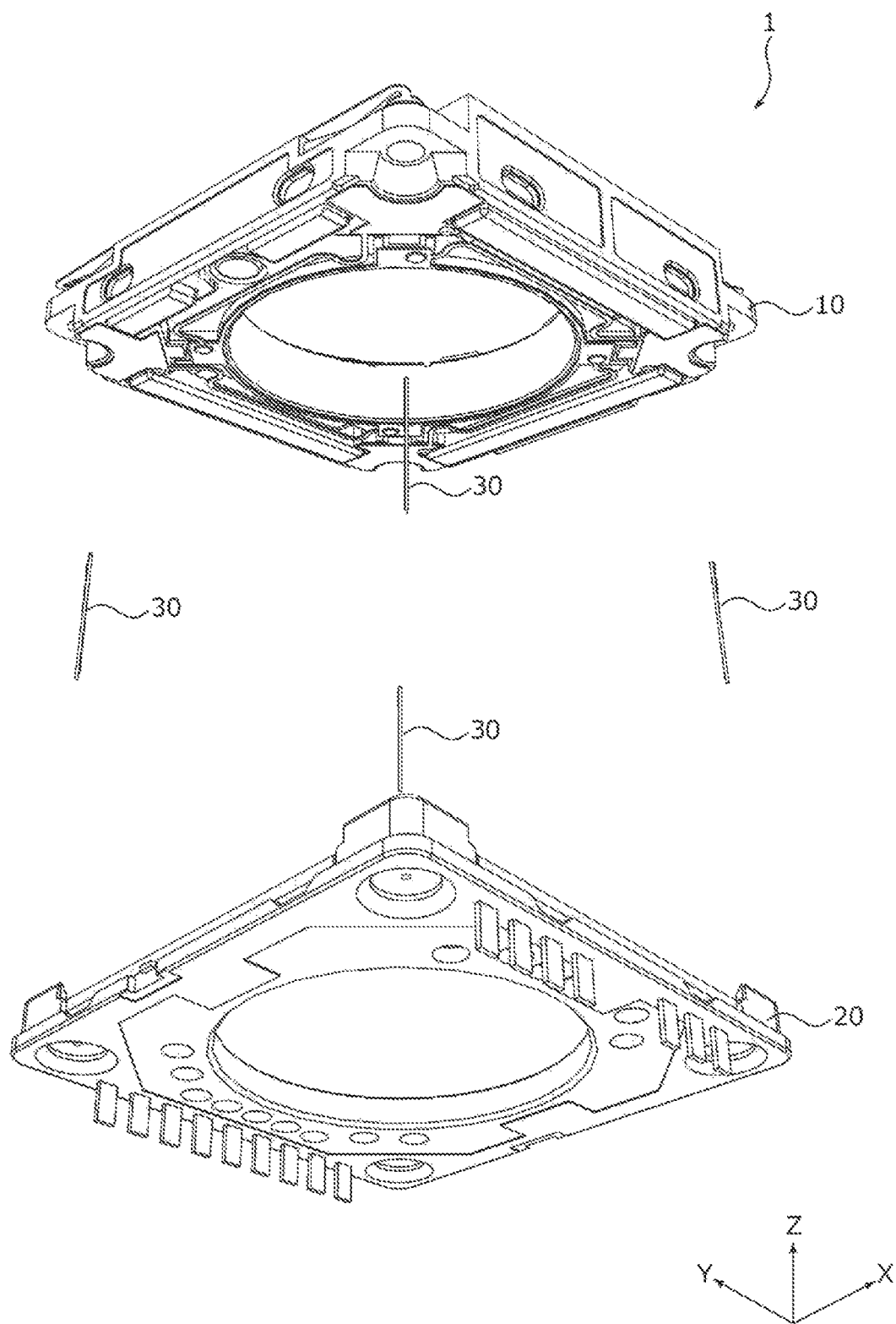
FIG. 5 is an exploded perspective view of the lens driving device.
Figure 6A:
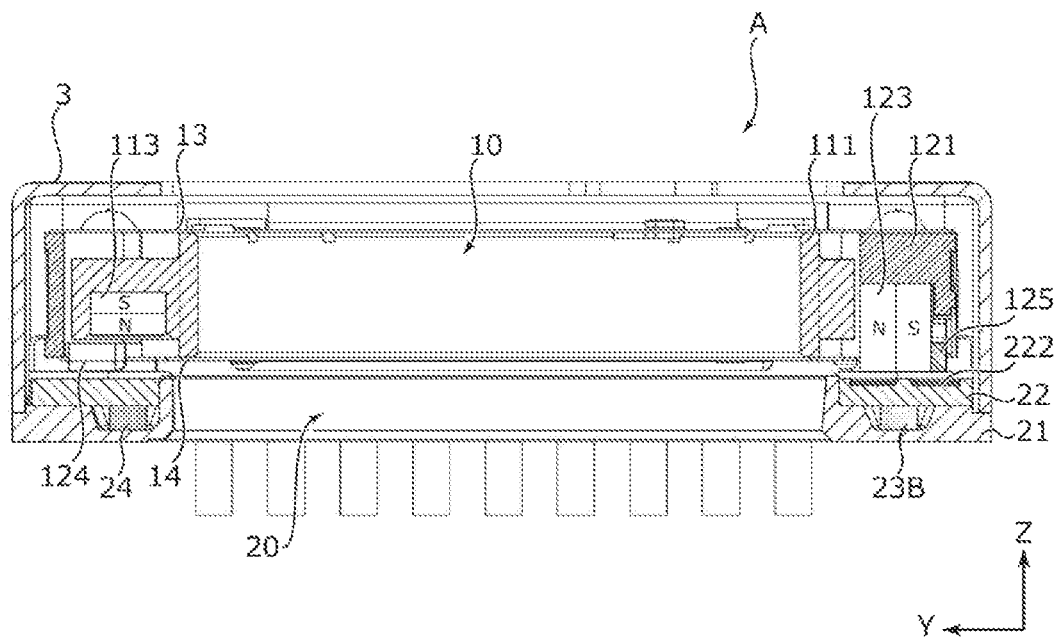
FIG. 6A and FIG. 6B are sectional views of the camera module.
Figure 6B:
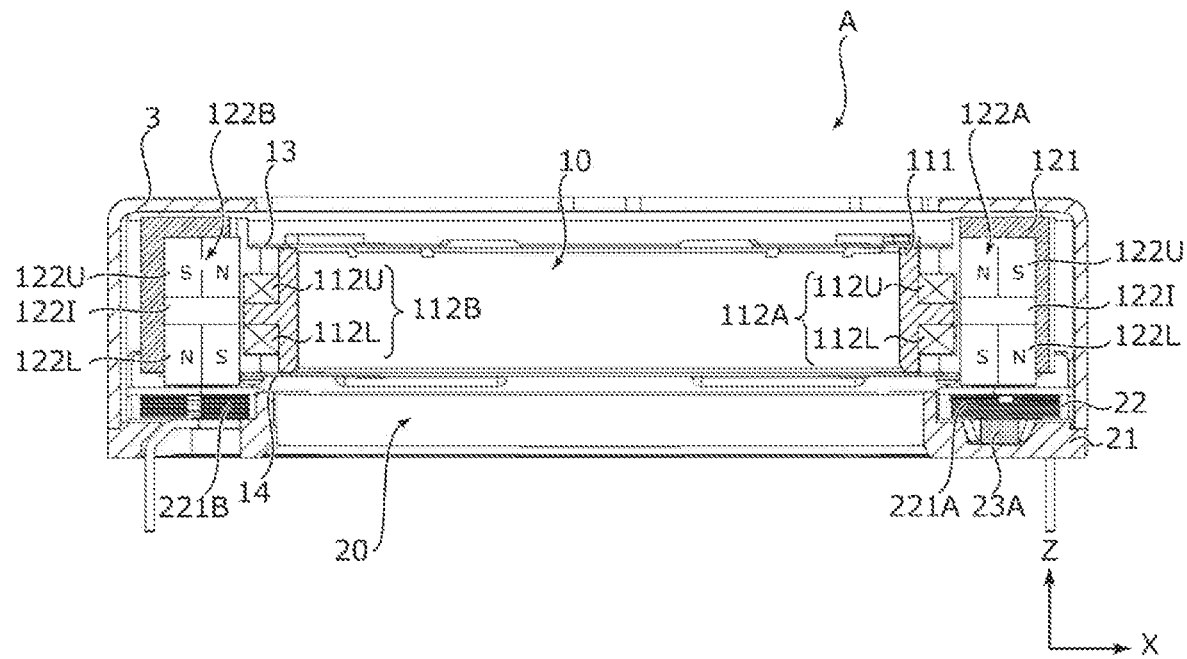

FIG. 3A and FIG. 3B are perspective views illustrating an external appearance of lens driving device 1. FIG. 3B is a diagram obtained by rotating FIG. 3A clockwise by 90° about the Z axis. FIG. 4 and FIG. 5 are exploded perspective views of lens driving device 1. FIG. 4 is a top perspective view, and FIG. 5 is a bottom perspective view. FIG. 6A and FIG. 6B are sectional views of camera module A. FIG. 6A is a sectional view in the YZ-plane passing through the optical axis, and FIG. 6B is a sectional view in the XZ-plane passing through the optical axis.

As illustrated in FIGS. 3A, 3B, 4, 5, 6A and 6B, lens driving device 1 includes OIS movable part 10, OIS fixing part 20, OIS supporting part 30, and the like.

OIS movable part 10 includes driving magnets 122A and 122B (OIS magnets) serving as an OIS voice coil motor, and sways in the XY plane during shake correction. OIS fixing part 20 includes OIS coils 221A, 221B and 222 serving as the OIS voice coil motor, and supports OIS movable part 10 by OIS supporting part 30. That is, the OIS driving part of lens driving device 1 is of a moving magnet type. OIS movable part 10 includes an AF driving apparatus including AF movable part 11 and AF fixing part 12 (see FIG. 7 and FIG. 8).

OIS movable part 10 is disposed away from OIS fixing part 20 on the light reception side in the optical axis direction, and is coupled with OIS fixing part 20 by OIS supporting part 30. In the present embodiment, OIS supporting part 30 is composed of four suspension wires extending along the Z direction (hereinafter referred to as "suspension wire 30").

One end (upper end) of suspension wire 30 is fixed to OIS movable part 10 (in the present embodiment, AF supporting part 13 (see FIG. 7 and FIG. 8)). In addition, the other end (lower end) of suspension wire 30 is fixed to OIS fixing part 20 (in the present embodiment, base 21). OIS movable part 10 is supported by suspension wire 30 such that OIS movable part 10 can sway in the XY plane. In the present embodiment, at least two of four suspension wires 30 are used as power supply paths for AF coils 112A and 112B. Note that the portions where suspension wires 30 are fixed in OIS movable part 10 and OIS fixing part 20 are merely examples, and are not limited thereto.

Figure 7:
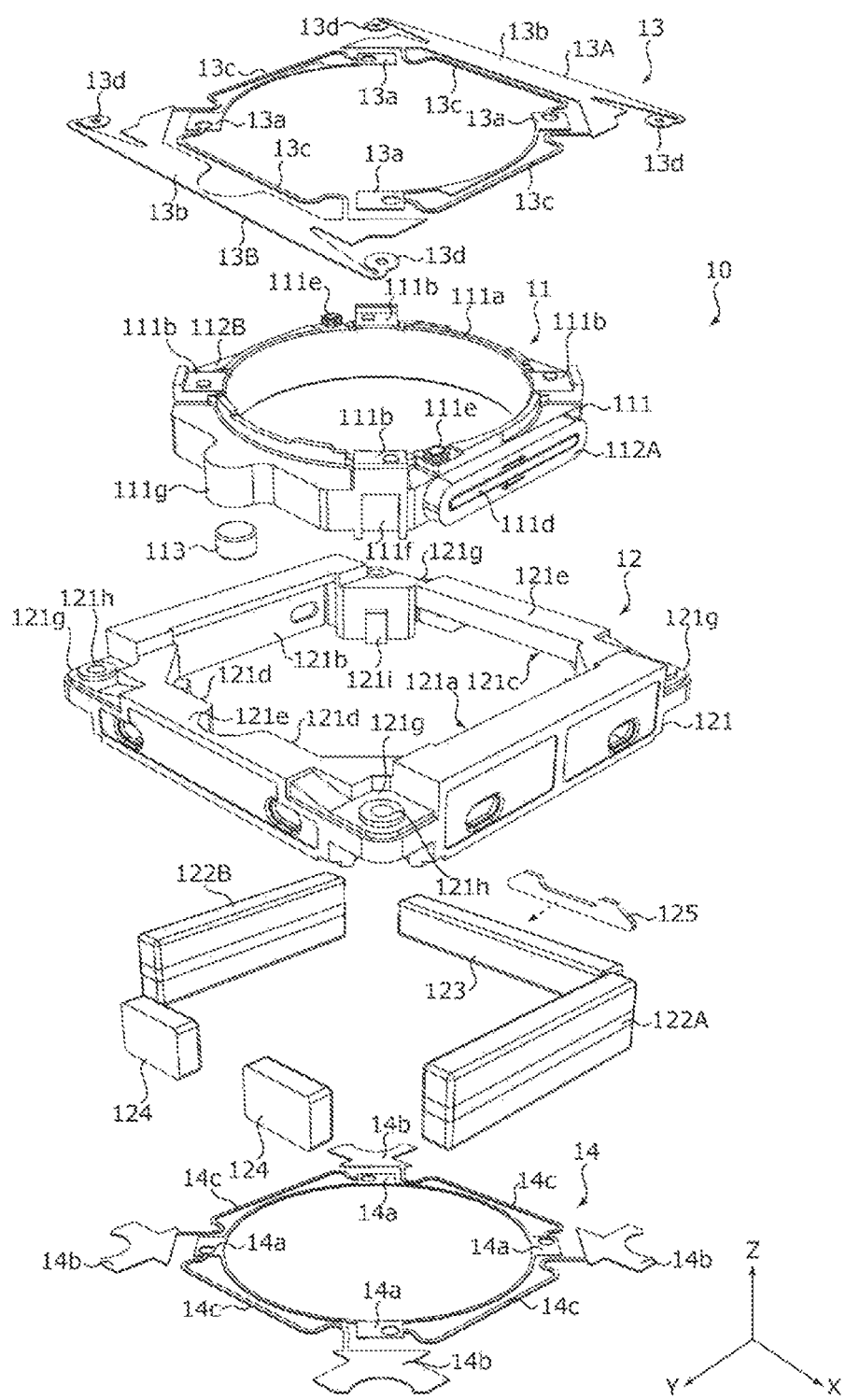
FIG. 7 is an exploded perspective view of an OIS movable part.
Figure 8:
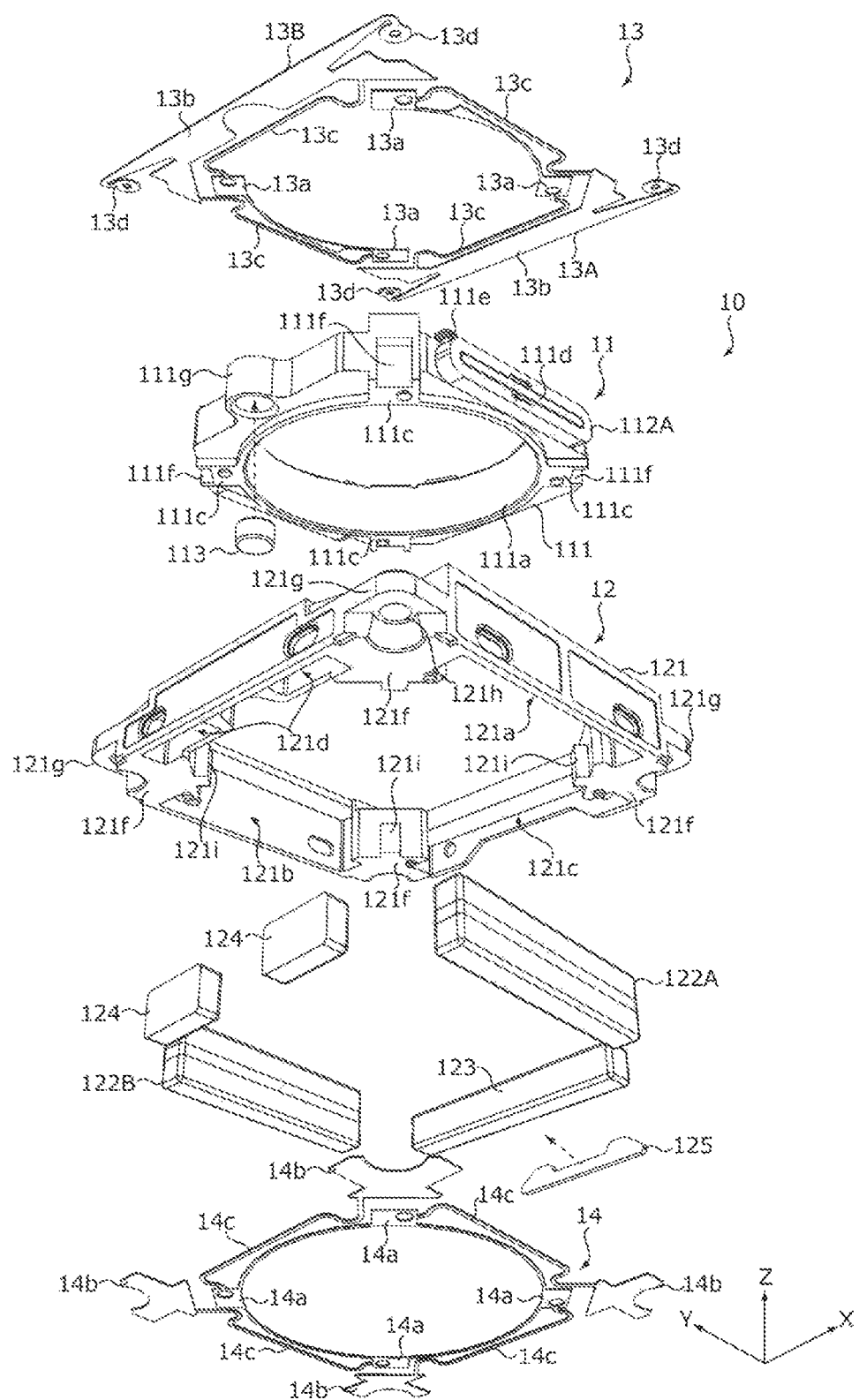
FIG. 8 is an exploded perspective view of the OIS movable part.

FIG. 7 and FIG. 8 are exploded perspective views of OIS movable part 10. FIG. 7 is a top perspective view, and FIG. 8 is a bottom perspective view.

As illustrated in FIG. 7 and FIG. 8, OIS movable part 10 includes AF movable part 11, AF fixing part 12, AF supporting parts 13 and 14 and the like.

AF movable part 11 includes AF coils 112A and 112B serving as an AF voice coil motor, and moves in the optical axis direction at the time of focusing. AF fixing part 12 includes driving magnet 123 (AF magnet), and supports AF movable part 11 by AF supporting parts 13 and 14. That is, an AF driving part of lens driving device 1 is of a moving coil type.

AF movable part 11 is disposed away from AF fixing part 12, and is coupled with AF fixing part 12 by AF supporting parts 13 and 14. In the present embodiment, AF movable part 11 is separated from AF fixing part 12 in the radial direction. AF supporting part 13 is an upper elastic support member that supports AF movable part 11 on the light reception side (upper side) in the optical axis direction with respect to AF fixing part 12. In the present embodiment, AF supporting part 13 is composed of two leaf springs 13A and 13B (hereinafter referred to as "upper springs 13A and 13B"). AF supporting part 14 is a lower elastic support member that supports AF movable part 11 on the imaging side (lower side) in the optical axis direction with respect to AF fixing part 12. In the present embodiment, AF supporting part 14 is composed of one leaf spring (hereinafter referred to as "lower spring 14").

AF movable part 11 includes lens holder 111, AF coils 112A and 112B, and Z-position detection magnet 113.

Lens holder 111 includes, at the center thereof, cylindrical lens housing part 111a. Lens part 2 (see FIG. 2) is fixed to lens housing part 111a by bonding or screwing. In the present embodiment, lens holder 111 has an octagonal external shape in plan view from the optical axis direction.

Lens holder 111 includes, on the top surface thereof, upper spring fixing parts 111b to which upper springs 13A and 13B are fixed. In the present embodiment, upper spring fixing parts 111b are provided at four corners of the top surface of lens holder 111, that is, at positions that intersect the diagonal direction passing through the optical axis. In the present embodiment, upper spring fixing part 111b includes a positioning boss (the reference numeral is omitted) protruding to the light reception side in the optical axis direction, and the positioning boss sets the positions of upper springs 13A and 13B.

Lens holder 111 includes, at the bottom surface thereof, lower spring fixing part 111c to which lower spring 14 is fixed. In the present embodiment, lower spring fixing parts 111c are provided at four corners of the bottom surface of lens holder 111. In the present embodiment, lower spring fixing part 111c includes a positioning boss (the reference numeral is omitted) protruding to the imaging side in the optical axis direction, and the positioning boss sets the position of lower spring 14.

Lens holder 111 includes coil attaching parts 111d and 111d to which AF coils 112A and 112B are attached. In the present embodiment, lens holder 111 includes, on the outer surfaces of the two side walls extending along the Y direction, coil attaching parts 111d having an elliptical shape (a rectangular shape with rounded corners) protruding in the radial direction.

Lens holder 111 includes, in a region near coil attaching part 111d on the top surface thereof, tying part 111e to which an end portion of AF coil 112 is connected. In addition, lens holder 111 includes, in the outer surfaces of the four corners, engagement grooves 111f to which restriction pieces 121i of magnet holder 121 are fitted.

Lens holder 111 includes magnet housing part 111g for housing Z-position detection magnet 113. In the present embodiment, magnet housing part 111g is provided so as to project in a radial direction (the Y direction) at an approximate center in the longitudinal direction (the X direction) at the outer surface of one wall extending along the X direction of lens holder 111. Magnet housing part 111g includes a magnet housing hole (the reference numeral is omitted) that opens to the lower side.

AF coils 112A and 112B are air-core coils that are energized at the time of focusing. In the present embodiment, AF coils 112A and 112B are wound around coil attaching part 111d into a flat shape. Specifically, each of AF coils 112A and 112B has an elliptical shape, and includes first straight line portion 112U and second straight line portion 112L.

AF coils 112A and 112B are disposed such that the coil surface is parallel to the optical axis, and in this case, AF coils 112A and 112B are disposed such that the YZ-plane is the coil surface. Specifically, AF coils 112A and 112B are disposed such that first straight line portion 112U is located on the light reception side in the optical axis direction (upper side), and second straight line portion 112L is located on the imaging side in the optical axis direction (lower side).

End portions of AF coils 112A and 112B are wound to tying part 11e of lens holder 111, and electrically connected with upper springs 13A and 13B. The energization current of AF coils 112A and 112B is controlled by drive control part 200 (see FIG. 11).

By employing a flat coil as in AF coils 112A and 112B, AF coils 112A and 112B are disposed only in the magnetic circuit portion formed by AF magnets 122A and 122B. Accordingly, in comparison with the case where the AF coil is formed through winding around the whole circumference of lens holder 111, the driving efficiency is improved, and weight reduction and power saving can be achieved.

Preferably, each of AF coils 112A and 112B is composed of a copper clad aluminum wiring line that is an aluminum line covered with copper. With this configuration, weight reduction can be achieved in comparison with the case where AF coils 112A and 112B are composed of copper wiring lines.

Z-position detection magnet 113 (position detection magnet) generates a magnetic field for detecting the position of AF movable part 11 in the optical axis direction. In the present embodiment, Z-position detection magnet 113 is composed of a unipolar magnet, and is disposed in magnet housing part 111g of lens holder 111 such that the magnetization direction is aligned with the optical axis direction. With this configuration, the magnetic field formed by Z-position detection magnet 113 efficiently crosses AF Hall device 24 (see FIG. 6A). Accordingly, the detection accuracy of AF Hall device 24 increases.

In addition, in the present embodiment, Z-position detection magnet 113 has a columnar shape. In this case, the output of AF Hall device 24 depends on the displacement (corresponding to the radius about the reference position) with respect to the reference position (the position in the XY plane in the state where the shake correction is not performed) of Z-position detection magnet 113. That is, when the displacements with respect to the reference position are identical, the outputs of AF Hall device 24 are substantially the same even when the position of OIS movable part 10 in the XY plane (hereinafter referred to as "XY-position") differs. Accordingly, the correction value for compensation for the influence of the shake correction can be easily calculated by performing radius conversion of the XY-position of OIS movable part 10 and expressing it as a displacement. In this manner, even when OIS movable part 10 sways in the XY plane due to the shake correction and the magnetic field intersecting AF Hall device 24 varies, the correction can be easily performed.

In addition, in the present embodiment, Z-position detection magnet 113 is disposed at a position where Z-position detection magnet 113 does not interfere with driving magnets 122A, 122B and 123. To be more specific, driving magnets 122A, 122B and 123 are disposed along the two sides extending along the Y direction and one side extending along the X direction of the four sides of the rectangular, and Z-position detection magnet 113 is disposed on the other side (particular side) extending along the X direction where driving magnets 122A, 122B and 123 are not disposed. In particular, in the present embodiment, Z-position detection magnet 113 is disposed at an approximate center of the particular side in the longitudinal direction. With this configuration, the influence of driving magnets 122A, 122B and 123 on the magnetic field formed by Z-position detection magnet 113 can be minimized, and thus the detection accuracy of AF Hall device 24 is improved.

AF fixing part 12 includes magnet holder 121, driving magnets 122A, 122B and 123, and counter weight 124.

Magnet holder 121 is disposed away from AF movable part 11 in the radial direction, and holds driving magnets 122A, 122B and 123. In the present embodiment, magnet holder 124 is composed of a rectangular cylinder member having a substantially square external shape in plan view.

The inner peripheral surface of magnet holder 121 is formed in a substantially octagonal shape so as to match the external shape of lens holder 111. In addition, in magnet holder 121, the portion corresponding to magnet housing part 111g of lens holder 111 is recessed radially outward.

Magnet holder 121 includes magnet holding parts 121a to 121c that hold AF and OIS driving magnets 122A, 122B and 123. In the present embodiment, magnet holding parts 121a and 121b that hold driving magnets 122A and 122B are provided in the inner surfaces of two side walls extending along the Y direction in magnet holder 121. In addition, magnet holding part 121c that holds driving magnet 123 is provided in the inner surface of one wall extending along the X direction in magnet holder 121. In the present embodiment, magnet holding parts 121a to 121c are provided with openings communicated with the outside (the reference numeral is omitted) such that an adhesive agent can be injected to the contact surfaces between magnet holding parts 121a to 121c and driving magnets 122A, 122B and 123. In addition, a cutout is formed at a portion corresponding to yoke 125 in magnet holding part 121c.

In addition, magnet holder 121 includes counter weight holding part 122d that holds counter weight 124. In the present embodiment, counter weight holding part 121d is provided in the other side wall extending along the X direction. In addition, in the present embodiment, counter weight holding part 121d is provided with an opening communicated with the outside (the reference numeral is omitted) such that an adhesive agent can be injected to the contact surface between counter weight holding part 121d and counter weight 124.

Magnet holder 121 includes, in the top surface thereof, upper spring fixing parts 121e where upper springs 13A and 13B are fixed. In the present embodiment, the top surface of magnet holder 121 extending along the X direction is upper spring fixing part 121e.

Magnet holder 121 includes, in the bottom surface thereof, lower spring fixing parts 121f where lower spring 14 is fixed. In the present embodiment, lower spring fixing parts 121f are provided at the four corners of the bottom surface of magnet holder 121. In the present embodiment, lower spring fixing part 121f includes a positioning boss (the reference numeral is omitted) protruding to the light reception side in the optical axis direction, and this positioning boss sets the position of lower spring 14.

In the present embodiment, magnet holder 121 includes, at the four corners thereof, wire insertion parts 121g. Wire insertion part 121g includes insertion hole 121h through which suspension wire 30 is inserted. The diameter of insertion hole 121h is set in consideration of the sway range of OIS movable part 10 in the XY plane. In addition, the lower portion of wire insertion part 121g is formed in an arc-like shape recessed radially inward. With this configuration, it is possible to avoid the interference between suspension wire 30 and magnet holder 121 at the time when OIS movable part 10 sways.

In addition, wire insertion part 121g is recessed to the imaging side in the optical axis direction with respect to upper spring fixing part 121e. Suspension wire 30 is inserted to wire insertion hole 121h and is connected with upper springs 13A and 13B by soldering, for example. Upper springs 13A and 13B extend in the state where upper springs 13A and 13B are separated from wire insertion part 121g above wire insertion part 121g (see FIG. 3).

Magnet holder 121 includes restriction piece 121i that restricts the movement of AF movable part 11. In the present embodiment, radially protruding restriction pieces 121i are provided on the inner surfaces of the four corners of magnet holder 121. Lens holder 111 is attached such that restriction piece 121i of magnet holder 121 is fit to engagement groove 111f. In a reference state where AF coils 112A and 112B are not energized, the top surface (the surface on the light reception side in the optical axis direction) of restriction piece 121i and the bottom surface (the surface on the light reception side in the optical axis direction) of engagement groove 111f are separated from each other. When AF movable part 11 moves to the imaging side in the optical axis direction, the bottom surface of engagement groove 111f of lens holder 111 makes contact with the top surface of restriction piece 121i of magnet holder 121, thereby restricting the movement of AF movable part 11 to the imaging side in the optical axis direction.

Driving magnets 122A and 122B function as a magnet (AF magnet) serving as an AF voice coil motor, and a magnet (OIS magnet) serving as the OIS voice coil motor in the X direction. Driving magnets 122A and 122B are attached to magnet holding parts 121a and 121b of magnet holder 121 and are fixed by bonding, for example. Specifically, driving magnets 122A and 122B are disposed away from AF coils 112A and 112B in the radial direction, and are disposed away from OIS coils 221A and 221B in the optical axis direction (see FIG. 6B).

Driving magnets 122A and 122B are magnetized so as to form a magnetic field that traverses AF coils 112A and 112B in the radial direction, and OIS coils 221A and 221B in the optical axis direction. In the present embodiment, each of driving magnets 122A and 122B is composed of a double-sided quadrupole magnet (e.g., a permanent magnet) having a cuboid shape and is magnetized in the short direction (the X direction) (see FIG. 6B). To be more specific, each of driving magnets 122A and 122B includes first magnet 122U and second magnet 122L. First magnet 122U and second magnet 122L are magnetized opposite to each other.

In driving magnets 122A and 122B, first magnet 122U is located on the light reception side in the optical axis direction, and second magnet 122L is located on the imaging side in the optical axis direction. That is, driving magnets 122A and 122B are disposed such that first magnet 122U is opposite to first straight line portion 112U of AF coils 112A and 112B, and second magnet 122L is opposite to second straight line portion 112L of AF coils 112A and 112B.

Mainly, the magnetic field of first magnet 122U traverses first straight line portion 112U, and the magnetic field of second magnet 122L traverses second straight line portion 112L. Since the direction of the magnetic field of first magnet 122U and the direction of the magnetic field of second magnet 122L are opposite to each other, the Z-directional Lorentz force in the same direction is generated at first straight line portion 112U and second straight line portion 112L when AF coils 112A and 112B are energized. In this manner, in the present embodiment, an AF voice coil motor is composed of driving magnets 122A and 122B and AF coils 112A and 112B.

Note that the magnetization directions at driving magnets 122A and 122B and the energization directions at AF coils 112A and 112B are set such that the directions of the Lorentz forces generated at AF coils 112A and 112B upon energization are aligned with each other.

In the present embodiment, in driving magnets 122A and 122B, non-magnetic layer 1221 is interposed between first magnet 122U and second magnet 122L. By adjusting the height of non-magnetic layer 1221, the region occupied by first magnet 122U and second magnet 122L (the areas of the opposing surfaces of AF coils 112A and 112B to first straight line portion 112U and second straight line portion 112L) can be easily adjusted while maintaining the height of the entirety of driving magnets 122A and 122B.

Driving magnet 123 is a magnet (OIS magnet) serving as the OIS voice coil motor in the Y direction. Driving magnet 123 is attached to magnet holding part 121c of magnet holder 121, and is fixed by bonding, for example. Specifically, driving magnet 123 is disposed away from OIS coil 222 in the optical axis direction (see FIG. 6A).

Driving magnet 123 is magnetized so as to form a magnetic field that traverses OIS coil 222 in the optical axis direction. In the present embodiment, driving magnet 123 is composed of a unipolar magnet (e.g., a permanent magnet) that has a cuboid shape, and is magnetized in the short direction (the Y direction) (see FIG. 6A). In addition, yoke 125 is disposed on the outer surface of driving magnet 123, and thus the magnetic field of driving magnet 123 efficiently traverses OIS coil 222. By disposing yoke 125, the thickness reduction of driving magnet 123 (weight reduction) can be achieved while ensuring the magnetic field that traverses OIS coil 222.

Counter weight 124 is a weight for stabilizing the horizontal orientation of OIS movable part 10 in the XY plane. Counter weight 124 is formed of a non-magnetic material such as brass and nickel silver, for example. In the present embodiment, two counter weights 124 are disposed in such a manner as to sandwich Z-position detection magnet 113 in the X direction. Counter weight 124 is inserted to counter weight holding part 121d of magnet holder 121 and is fixed by bonding, for example. The weight of counter weight 124 is set in consideration of the weights of driving magnet 123, Z-position detection magnet 113 and the like such that OIS movable part 10 is balanced in the Y direction. Note that the position, number and the like of counter weights 124 may be appropriately changed.

Upper springs 13A and 13B elastically supports AF movable part 11 (lens holder 111) with respect to AF fixing part 12 (magnet holder 121). Upper springs 13A and 13B are formed of beryllium copper, nickel copper, stainless-steel or the like, for example. Upper springs 13A and 13B are shaped by punching of one sheet metal, for example. In the present embodiment, each of upper springs 13A and 13B has a square shape in its entirety.

Each of upper springs 13A and 13B includes lens holder fixing part 13a that is fixed to lens holder 111, magnet holder fixing part 13b that is fixed to magnet holder 121, and arm part 13c that is elastically deformed along with a movement of AF movable part 11. Upper springs 13A and 13B are positioned with respect to lens holder 111 and magnet holder 121 and fixed thereto by bonding, for example.

In the present embodiment, lens holder fixing part 13a has a shape corresponding to upper spring fixing part 111b of lens holder 111. Regarding lens holder fixing part 13a, two lens holder fixing parts 13a are coupled along the periphery of lens housing part 111a of lens holder 111 in each of upper springs 13A and 13B. When AF movable part 11 moves in the optical axis direction, lens holder fixing part 13a displaces together with AF movable part 11.

In the present embodiment, magnet holder fixing part 13b has a shape corresponding to upper spring fixing part 121e of magnet holder 121, and extends along the X direction. Arm part 13c couples lens holder fixing part 13a and magnet holder fixing part 13b. Arm part 13c has a curved part (the reference numeral is omitted) so as to be easily elastically deformed when AF movable part 11 moves.

In addition, upper springs 13A and 13B include, at both ends of magnet holder fixing part 13b, wire connecting parts 13d to which suspension wires 30 are connected. In the present embodiment, wire connecting part 13d is extended from magnet holder fixing part 13b along the X direction and is bent inward at a corner portion. Wire connecting part 13d includes a wire insertion hole (the reference numeral is omitted) at an end thereof. Suspension wire 30 is inserted to the wire insertion hole, and is physically and electrically connected by soldering, for example.

In addition, wire connecting part 13d is located above wire insertion part 121g of magnet holder 121, and a gap is defined between wire connecting part 13d and wire insertion part 121g of magnet holder 121 (see FIG. 3). A damper (not illustrated) is disposed in the gap so as to surround suspension wire 30. The damper (not illustrated) interposed between upper springs 13A and 13B and magnet holder 121 suppresses generation of unnecessary resonance (high-order resonance mode), and thus stability of the operation can be ensured. The damper can be readily applied by use of a dispenser, for example. Examples of the damper include an ultraviolet curing silicone gel.

Lower spring 14 elastically supports AF movable part 11 (lens holder 111) with respect to AF fixing part 12 (magnet holder 121). As with upper springs 13A and 13B, lower spring 14 is formed of beryllium copper, nickel copper, stainless-steel or the like, for example. Lower spring 14 is shaped by punching a one sheet metal, for example. In the present embodiment, lower spring 14 has a square shape in its entirety.

Lower spring 14 includes lens holder fixing part 14a that is fixed to lens holder 111, magnet holder fixing part 14b that is fixed to magnet holder 121, and arm part 14c that elastically deforms along with the movement of AF movable part 11. Lower spring 14 is positioned with respect to lens holder 111 and magnet holder 121 and is fixed by bonding, for example.

In the present embodiment, lens holder fixing part 14a has a shape corresponding to lower spring fixing part 111c of lens holder 111. Four lens holder fixing parts 14a are coupled along the periphery of lens housing part 111a of lens holder 111. Lens holder fixing part 14a displaces together with AF movable part 11 when AF movable part 11 moves in the optical axis direction.

In the present embodiment, magnet holder fixing part 14b has a shape corresponding to lower spring fixing part 121f of magnet holder 121. The corner portion of magnet holder fixing part 14b is cut out inward into an arc-like shape so as to prevent the interference with suspension wire 30. Arm part 14c couples lens holder fixing part 13a and magnet holder fixing part 13b. Arm part 13c includes a curved part (the reference numeral is omitted) so as to be easily elastically deformed when AF movable part 11 moves.

During assembly of OIS movable part 10, AF coils 112A and 112B and Z-position detection magnet 113 are attached to lens holder 111. On the other hand, driving magnets 122A, 122B and 123 and counter weight 124 are attached to magnet holder 121. In this state, lens holder 111 is attached to magnet holder 121 from the light reception side in the optical axis direction. Specifically, lens holder 111 is disposed inside magnet holder 121 such that AF coils 112A and 112B are opposite to driving magnets 122A and 122B.

Then, upper springs 13A and 13B are attached on the top surfaces of lens holder 111 and magnet holder 121, and lower spring 14 is attached on the bottom surfaces of lens holder 111 and magnet holder 121. In addition, a part of upper springs 13A and 13B is soldered to one end portion of AF coils 112A and 112B tied to tying part 111e of lens holder 111 so as to be physically and electrically connected. AF coils 112A and 112B are energized through suspension wire 30 and upper springs 13A and 13B.

Figure 9:
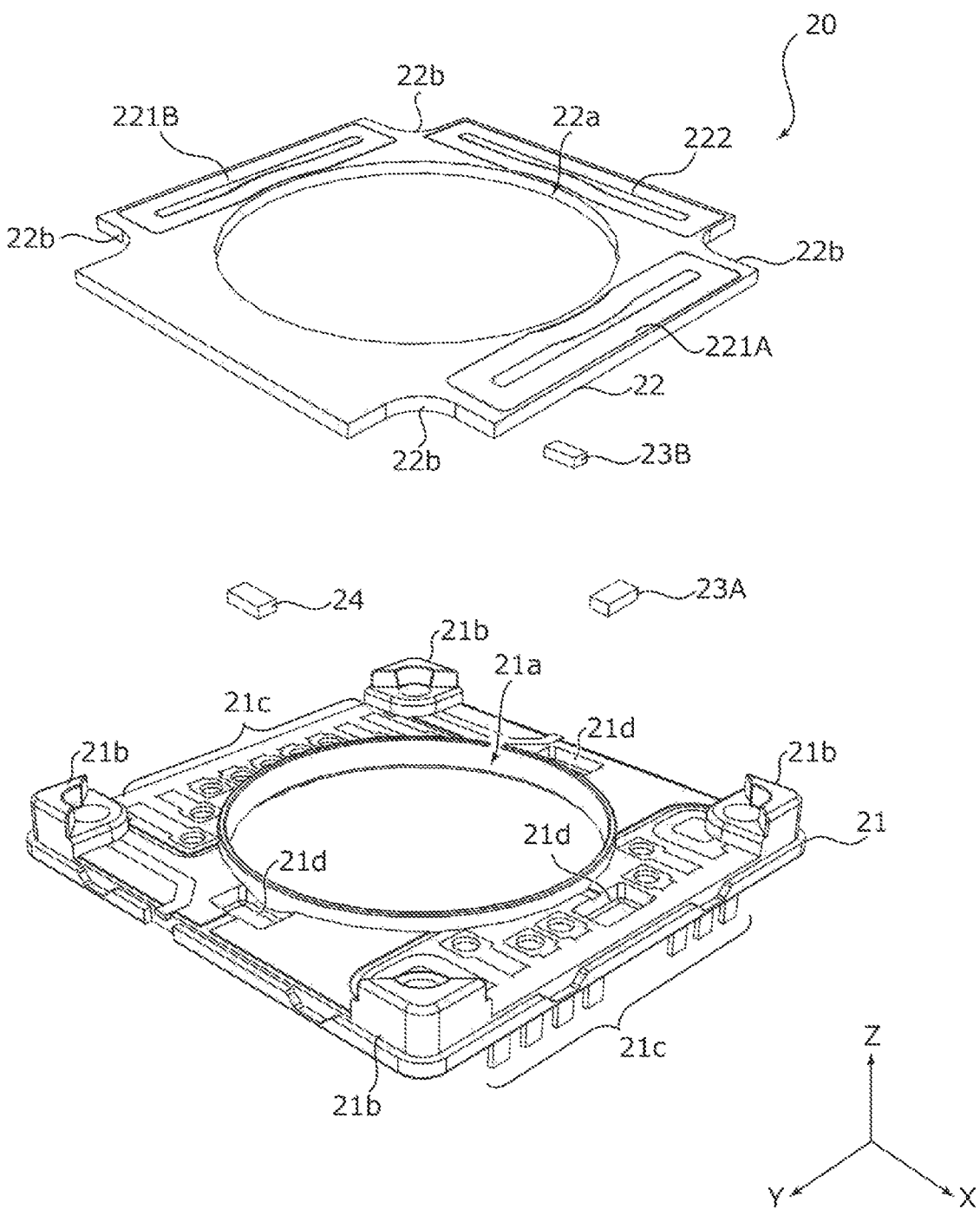
FIG. 9 is an exploded perspective view of an OIS fixing part.
Figure 10:
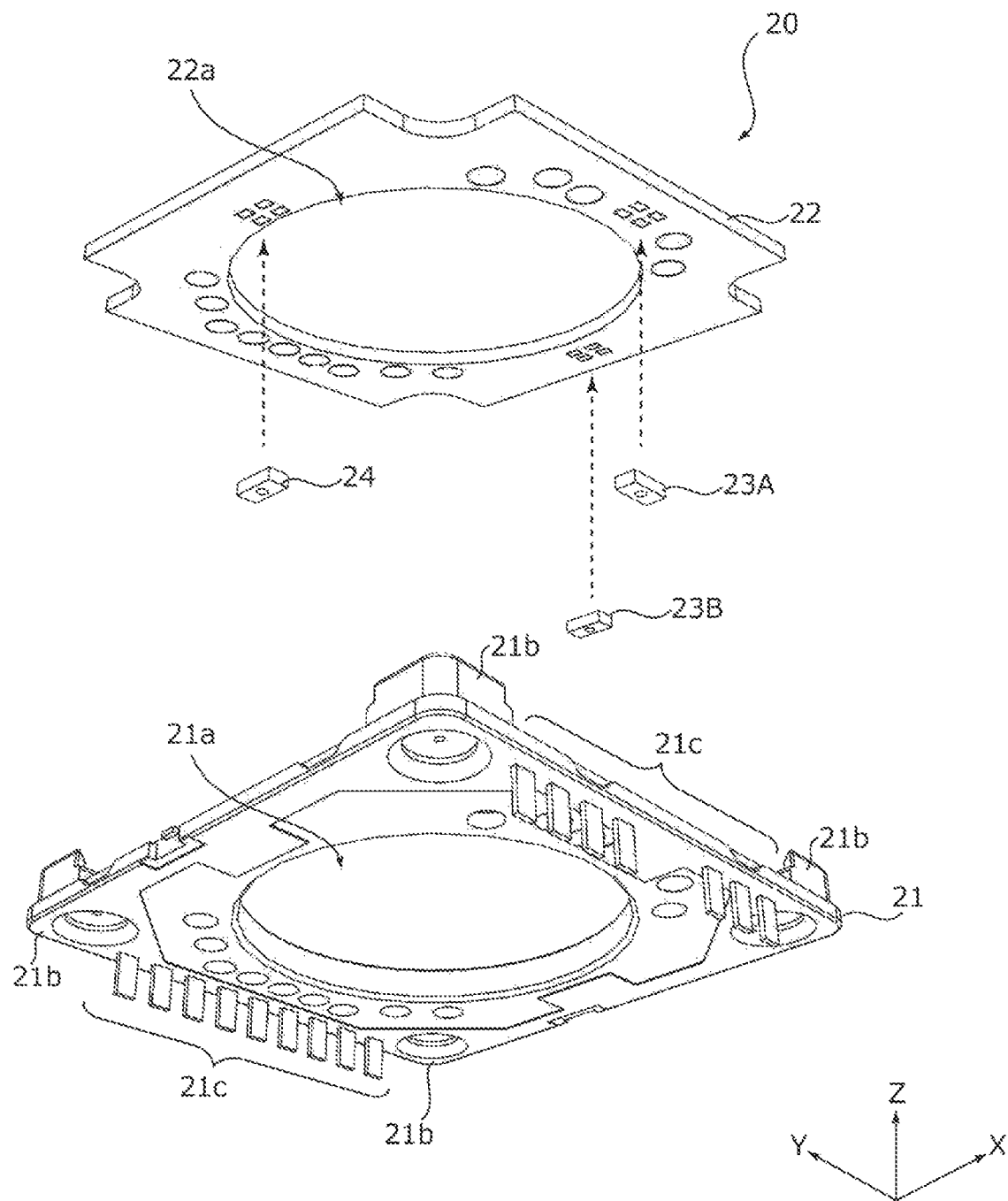
FIG. 10 is an exploded perspective view of the OIS fixing part.

FIG. 9 and FIG. 10 are exploded perspective views of OIS fixing part 20. FIG. 9 is a top perspective view, and FIG. 10 is a bottom perspective view. As illustrated in FIG. 9 and FIG. 10, OIS fixing part 20 includes base 21, coil substrate 22, OIS Hall devices 23A and 23B, AF Hall device 24 and the like.

Base 21 includes, at the center thereof, circular opening 21a. In camera module A, an image sensor substrate (not illustrated) on which an imaging device (not illustrated) is mounted is disposed on the imaging side of base 21 in the optical axis direction.

In the present embodiment, base 21 has a substantially square shape in plan view. In addition, base 21 includes, at the four corners thereof, wire fixing parts 21b to which the other ends of suspension wires 30 are fixed. Each of the four corners of wire fixing part 21b protrudes to the light reception side in the optical axis direction, and has a shape corresponding to the lower portion of wire insertion part 121g of magnet holder 121. The other end (lower end) of suspension wire 30 is electrically connected with terminal metal fitting 21c embedded inside wire fixing part 21b by soldering, for example.

Base 21 includes terminal metal fitting 21c integrally shaped by insert molding, for example. In the present embodiment, terminal metal fitting 21c is provided at the two sides extending along the Y direction, and is bent to the imaging side in the optical axis direction. One end of terminal metal fitting 21c is electrically connected with an image sensor substrate (not illustrated). The other end of terminal metal fitting 21c is electrically connected with a wiring pattern (not illustrated) of coil substrate 22 or suspension wire 30.

In addition, base 21 includes, at the peripheral portion of opening 21a, Hall device housing part 21d that houses OIS Hall devices 23A and 23B and AF Hall device 24.

Coil substrate 22 includes, at the center thereof, circular opening 22a. In coil substrate 22, OIS coils 221A, 221B and 222 are disposed at the periphery of opening 22a. In the present embodiment, coil substrate 22 has a square shape in plan view as with base 21. In addition, coil substrate 22 includes, at the four corners, cutout part 22b formed in a shape corresponding to wire fixing part 21b of base 21. With wire fixing part 21b of base 21 and cutout part 22b of coil substrate 22, base 21 and coil substrate 22 are aligned with each other.

OIS coils 221A, 221B and 222 are disposed at respective positions opposite to driving magnets 122A, 122B and 123 in the optical axis direction. OIS coils 221A and 221B are coils for moving OIS movable part 10 in the X direction, and OIS coil 222 is a coil for moving OIS movable part 10 in the Y direction. An end portion of each OIS coils 221A, 221B and 222 are connected with the wiring pattern (not illustrated) of coil substrate 22 by soldering, for example.

The sizes and the positions of OIS coils 221A, 221B and 222 and/or driving magnets 122A, 122B and 123 are set such that the magnetic fields radiated from the bottom surfaces of driving magnets 122A, 122B and 123 traverse the long side portions of OIS coils 221A, 221B and 222 in the optical axis direction. The energization current of OIS coils 221A, 221B and 222 are controlled by drive control part 200 (see FIG. 11). With this configuration, in the present embodiment, an OIS voice coil motor is composed of driving magnet magnets 122A, 122B and 123 and OIS coils 221A, 221B and 222.

In addition, coil substrate 22 includes a wiring pattern including a power line (not illustrated) for supplying power to OIS coils 221A, 221B and 222, and a signal line (not illustrated) for detection signals output from OIS Hall devices 23A and 23B and AF Hall device 24. The wiring pattern is electrically connected with terminal metal fitting 21c of base 21 by soldering, for example. OIS Hall devices 23A and 23B and AF Hall device 24 are disposed on the rear surface of coil substrate 22. OIS Hall devices 23A and 23B and AF Hall device 24 detect the magnetic field by utilizing Hall effect.

OIS Hall devices 23A and 23B are disposed at respective positions opposite driving magnets 122A and 123 in the optical axis direction (see FIG. 6A and FIG. 6B). In the present embodiment, OIS Hall devices 23A and 23B are respectively disposed at approximate centers of adjacent two sides of the bottom surface of coil substrate 22. The position of OIS movable part 10 in the XY plane can be specified by detecting the magnetic field formed by driving magnets 122A and 123 at OIS Hall devices 23A and 23B. Specifically, in the present embodiment, "second position detection part" of the subject application invention is composed of OIS Hall devices 23A and 23B and driving magnets 122A and 123.

Note that a magnet for the XY-position detection may be disposed in OIS movable part 10 separately from driving magnets 122A and 123. That is, in the present embodiment, driving magnets 122A and 123 serve also as an XY-position detection magnet.

AF Hall device 24 is disposed at a position opposite Z-position detection magnet 113 in the optical axis direction (see FIG. 6A). The position of AF movable part 11 in the optical axis direction can be specified by detecting the magnetic field formed by Z-position detection magnet 113 at AF Hall device 24. Specifically, in the present embodiment, the "first position detection part" of the subject application invention is composed of AF Hall device 24 and Z-position detection magnet 113.

In the present embodiment, unipolar Z-position detection magnet 113 is disposed such that the magnetization direction and the optical axis direction are aligned with each other, and Z-position detection magnet 113 and AF Hall device 24 are opposite to each other in the optical axis direction, and thus, the relationship between the magnitude of the magnetic field and the position in the optical axis direction has high correlation. Accordingly, the position of AF movable part 11 in the optical axis direction can be accurately calculated.

As described above, in the present embodiment, as with OIS Hall devices 23A and 23B, AF Hall device 24 is also disposed in OIS fixing part 20. Thus, in comparison with conventional techniques in which the AF Hall device is disposed in the OIS movable part (see PTL 1), the configuration for position detection of AF movable part 11 can be simplified. For example, in PTL 1, the OIS supporting part is composed of six suspension wires, and is used not only as lines for supplying power to AF coil, but also as lines for supplying power to the AF Hall device and the signal line of the AF Hall device. The present embodiment does not require such a configuration, and therefore the degree of freedom in design is high. In addition, since the structure is simplified, the thickness of the AF driving part can be reduced, and thus the height reduction of lens driving device 1 can be achieved.

In addition, since the members susceptible to impact such as the suspension wire can be reduced, the reliability of lens driving device 1 can be improved. Further, since OIS Hall devices 23A and 23B and AF Hall device 24 can be mounted to coil substrate 22 through one process, the man-hour count in the manufacture can be reduced.

In addition, since one side of the four sides of the rectangular is not provided with driving magnets 122A, 122B and 123 in lens driving device 1, lens driving device 1 is useful for dual cameras. By disposing the other lens driving device next to the side where driving magnets 122A, 122B and 123 are not provided, interference between the magnets can be suppressed.

Lens driving device 1 includes an AF driving part and a shake-correcting driving part. The AF driving part includes AF coils 112A and 112B disposed at the periphery of lens part 2 and driving magnets 122A and 122B (auto-focusing magnet) disposed away from AF coils 112A and 112B in the radial direction. The AF driving part moves AF movable part 11 including AF coils 112A and 112B in the optical axis direction with respect to AF fixing part 12 including driving magnets 122A and 122B. The shake-correcting driving part includes driving magnets 122A, 122B and 123 (shake-correcting magnet) disposed in the AF driving part, and shake-correcting coils 221A, 221B and 222 disposed away from shake-correcting magnets 122A, 122B and 123 in the optical axis direction. The shake-correcting driving part sways OIS movable part 10 (shake correction movable part) including the AF driving part and the driving magnets 122A, 122B and 123 in a plane orthogonal to the optical axis direction with respect to OIS fixing part 20 (shake correction fixing part) including shake-correcting coils 221A, 221B and 222.

AF movable part 12 includes Z-position detection magnet 113 (position detection magnet), and OIS fixing part 20 includes AF Hall device 24 disposed opposite Z-position detection magnet 113 in the optical axis direction.

With lens driving device 1, it is not necessary to use suspension wire 30 and the like as the feeding line and the signal line of AF Hall device 24, and thus the configuration for detecting the position of AF movable part 11 in the optical axis direction can be simplified, and, the reliability of the AF driving part can be improved.

Figure 11:
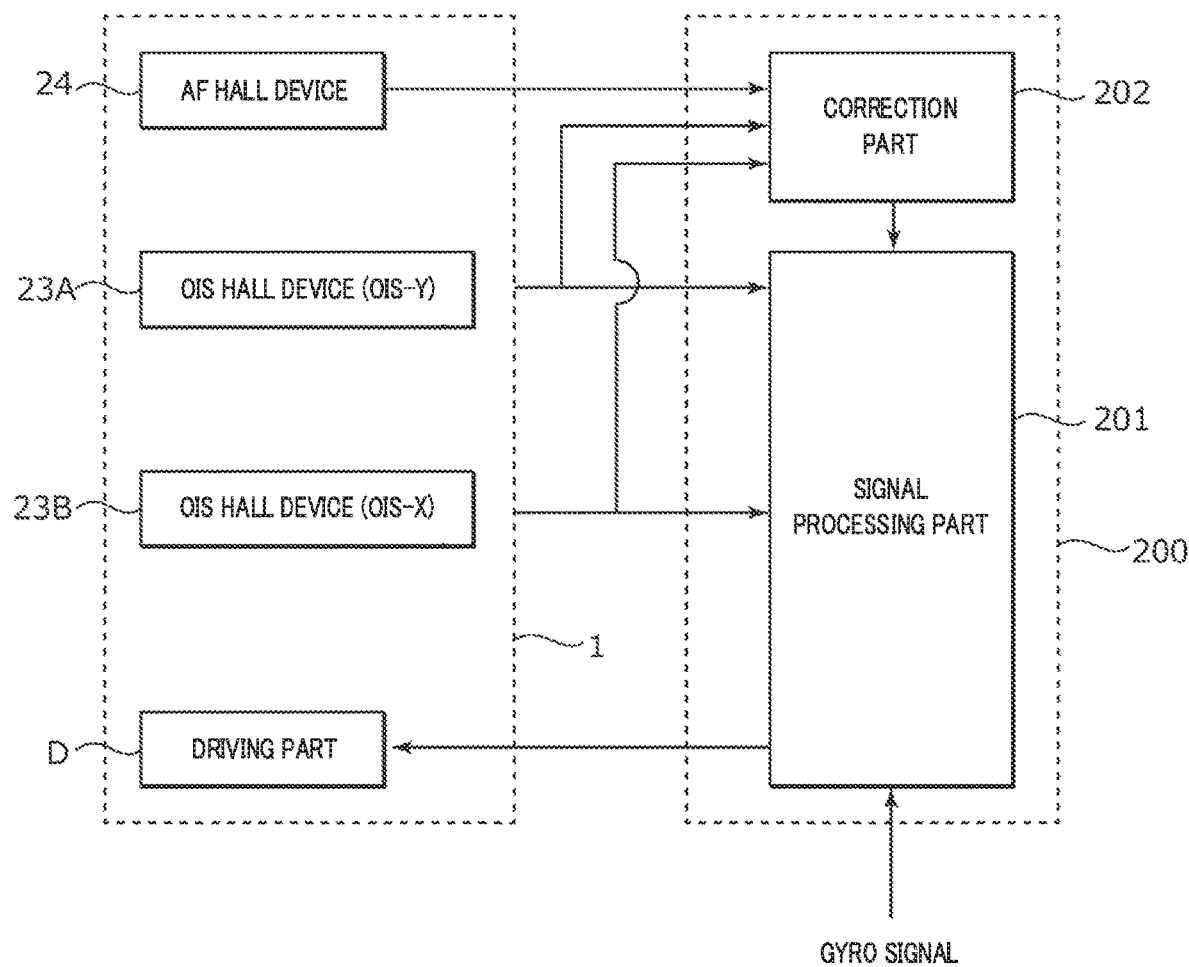
FIG. 11 is a block diagram illustrating an AF function and an OIS function in the lens driving device.

FIG. 11 is a block diagram illustrating the AF function and the OIS function in camera module A. In FIG. 11, the AF driving part including AF coils 112A and 112B and the OIS driving part including OIS coils 221A, 221B and 222 are collectively referred to as "driving part D".

As illustrated in FIG. 11, the AF function and the OIS function of camera module A are achieved by drive control part 200. Drive control part 200 is mounted in the image sensor substrate (not illustrated), for example. Drive control part 200 includes signal processing part 201, correction part 202 and the like. Signal processing part 201 and correction part 202 are composed of an electronic circuit such as a DSP (Digital Signal Processor), an ASIC (Application Specific Integrated Circuit), a PLD (Programmable Logic Device) and the like, for example.

Note that, in the case where the camera-mounting apparatus in which camera module A is mounted includes drive control part 200, drive control part 200 may be composed of a computer including a CPU (Central Processing Unit) as a computation/control apparatus, a ROM (Read Only Memory) and a RAM (Random Access Memory) as a main storage apparatus and the like such that signal processing part 201 and correction part 202 serve the functions when the CPU executes programs, for example.

When shake correction is performed in camera module A, signal processing part 201 performs an energization control of OIS coils 221A, 221B and 222. To be more specific, signal processing part 201 controls the energization current of OIS coils 221A, 221B and 222 on the basis of a detection signal (gyro signal) from a shake detection part (e.g., a gyro sensor not illustrated) so as to compensate for the shake of camera module A. At this time, by performing feedback of a detection result of OIS Hall devices 23A and 23B, the sway of OIS movable part 10 can be correctly controlled.

When OIS coils 221A, 221B and 222 are energized, a Lorentz force is generated at OIS coils 221A, 221B and 222 by interaction of the magnetic field of driving magnets 122A, 122B and 123 and the current flowing through OIS coils 221A, 221B and 222 (Fleming's left hand rule). The direction of the Lorentz force is the direction (the Y direction or the X direction) orthogonal to the direction (the Z direction) of the magnetic field at the long side portions of OIS coils 221A, 221B and 222 and the current direction (the X direction or the Y direction). Since OIS coils 221A, 221B and 222 are fixed, reactive forces are exerted on driving magnets 122A, 122B and 123. With these reactive forces serving as the driving force of the OIS voice coil motor, OIS movable part 10 including driving magnets 122A, 122B and 123 sways in the XY plane, thereby performing shake correction.

When auto focus is performed in camera module A, energization control of AF coils 112A and 112B is performed by signal processing part 201. To be more specific, signal processing part 201 controls the energization current to AF coils 112A and 112B on the basis of the detection result of AF Hall device 24. At this time, in the present embodiment, correction part 202 corrects a detection result of AF Hall device 24 on the basis the detection result of OIS Hall devices 23A and 23B. The AF control process in camera module A is elaborated below with reference to FIG. 12.

Figure 12:
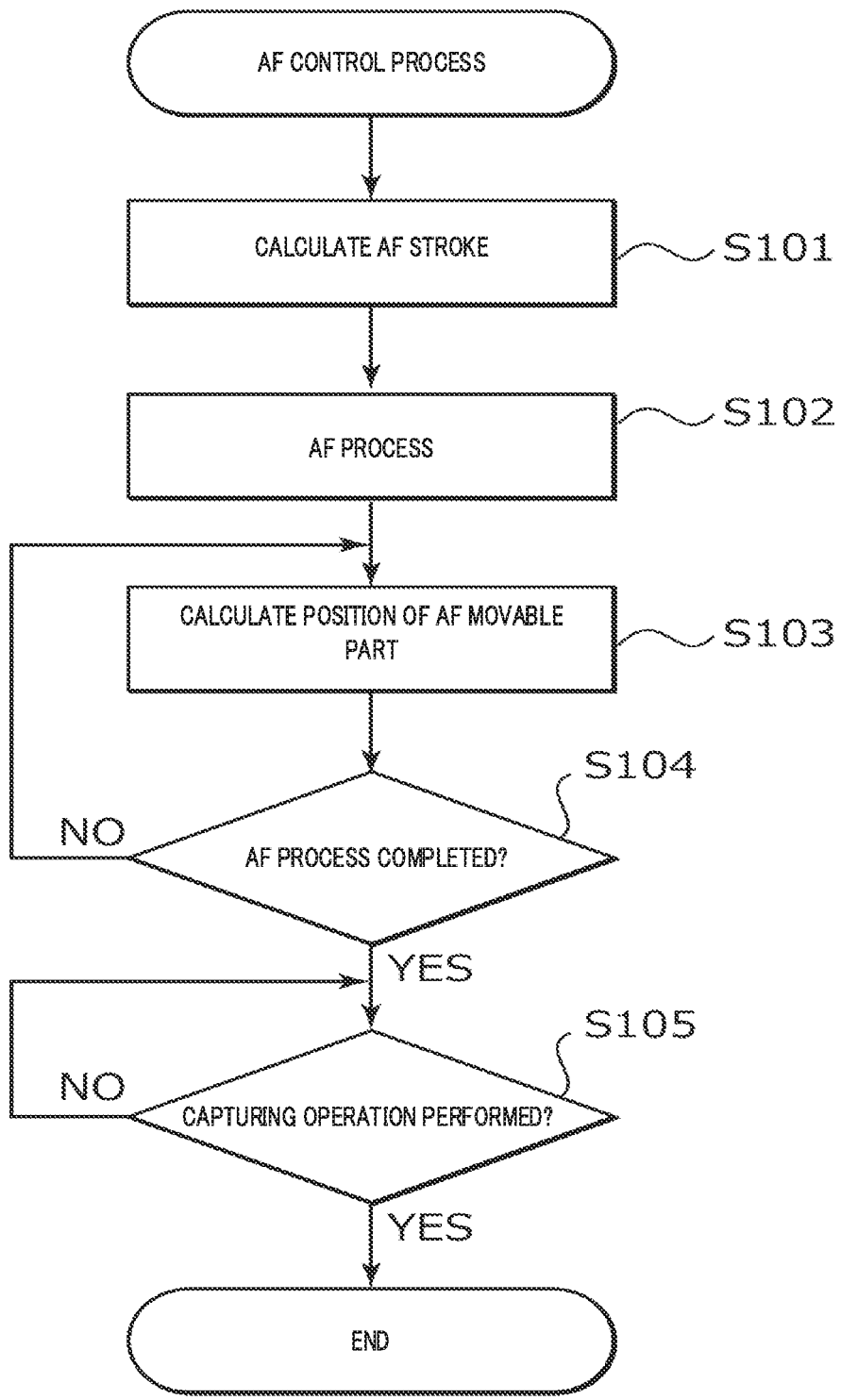
FIG. 12 is a flowchart of an exemplary AF control process in the lens driving device.

FIG. 12 illustrates an exemplary flowchart of an AF control process in camera module A. The flowchart illustrated in FIG. 12 is executed by drive control part 200 in response to execution of a capturing preparation operation (e.g., a halfway-push operation on a shutter button) at smartphone M, for example.

At step S101 in FIG. 12, drive control part 200 calculates the AF stroke for performing auto focus on the basis of a subject image acquired by an imaging device (not illustrated) (a function as signal processing part 201). An image surface phase difference auto focus scheme may be adopted for the calculation of the AF stroke, for example.

At step S102, as an AF process, drive control part 200 performs an energization control of AF coils 112A and 112B such that AF movable part 11 moves by the AF stroke calculated at step S101 (a function as signal processing part 201).

When AF coils 112A and 112B are energized, a Lorentz force is generated at AF coils 112A and 112B by interaction of the magnetic field of driving magnets 122A and 122B and the current flowing through AF coils 112A and 112B. The direction of the Lorentz force is the direction (the Z direction) orthogonal to the direction of the magnetic field (the X direction or the Y direction) and the direction of the current flowing through AF coils 112A and 122B (the Y direction or the X direction). Since driving magnets 122A and 122B are fixed, reactive forces are exerted on AF coils 112A and 112B. With these reactive forces serving as a driving force of the AF voice coil motor, AF movable part 11 including AF coils 112A and 112B moves in the optical axis direction, thereby performing focusing.

At step S103, drive control part 200 calculates the position of AF movable part 11 in the optical axis direction on the basis of the detection result of AF Hall device 24 and OIS Hall devices 23A and 23B (a process as signal processing part 201 and correction part 202). To be more specific, drive control part 200 calculates the XY-position of OIS movable part 10 on the basis of the output of OIS Hall devices 23A and 23B. Then, drive control part 200 corrects the output of AF Hall device 24 (see FIG. 13A) on the basis of the XY-position of OIS movable part 10 (see FIG. 13B and FIG. 13C). With this configuration, the position of AF movable part 11 in the optical axis direction can be correctly calculated. In the present embodiment, since Z-position detection magnet 113 has a columnar shape, the correction process can be simplified by performing radius conversion of the XY-position of OIS movable part 10 and expressing it as a displacement from the reference position.

Figure 13A:
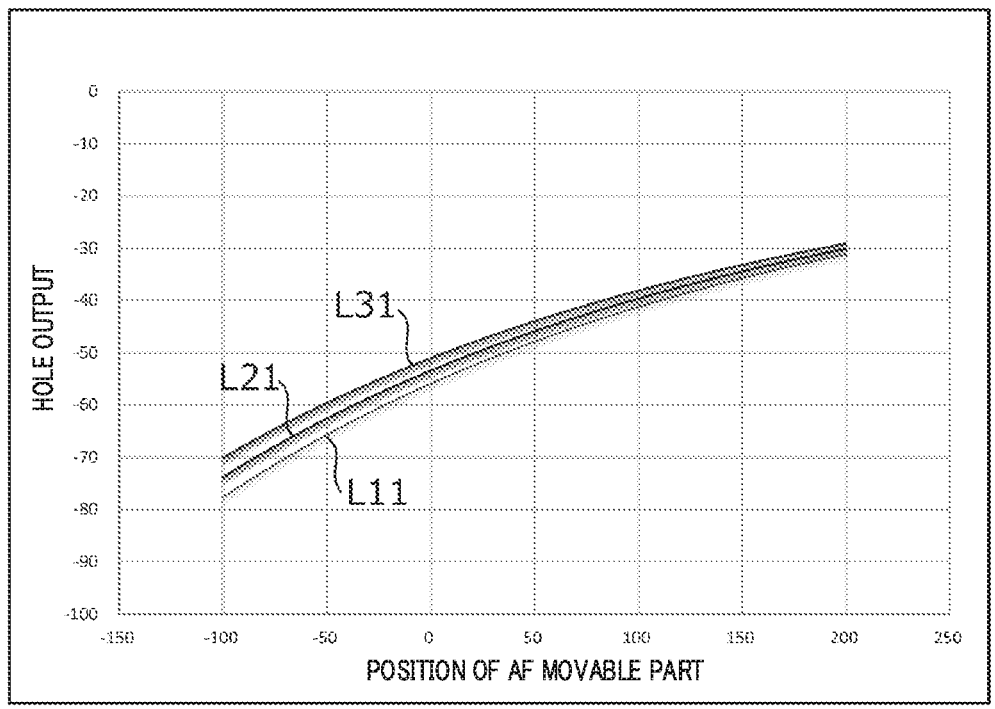
FIG. 13A to FIG. 13C illustrate a correction process by a drive control part.

FIG. 13A illustrates a relationship between the position of AF movable part 11 in the optical axis direction and the output of AF Hall device 24 (hereinafter referred to as "AF hole output"). The position of AF movable part 11 in the optical axis direction can have a value within a range of −100 μm to +200 μm. At −100 μm, the position of AF movable part 11 is on the most imaging side in the optical axis direction, and at +200 μm, the position is on the most light reception side in the optical axis direction. In FIG. 13A, L11 represents an AF hole output in the case where OIS movable part 10 is located at the reference position, L21 represents an AF hole output in the case where the displacement of OIS movable part 10 with respect to the reference position is 120 μm, and L31 represents an AF hole output in the case where the displacement of OIS movable part 10 with respect to the reference position is 170 μm.

As illustrated in FIG. 13A, the AF hole output decreases as AF movable part 11 (Z-position detection magnet 113) is separated away from AF Hall device 24. In addition, the deviation from AF hole output L11 as the reference increases as the displacement of OIS movable part 10 increases.

Figure 13B:
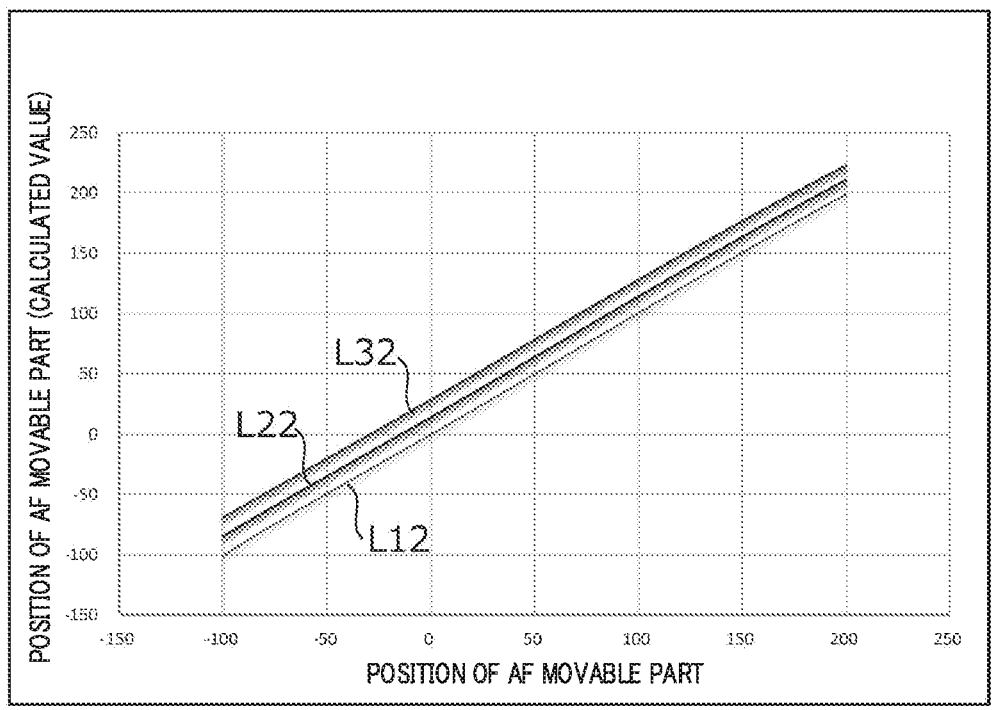

FIG. 13B illustrates a relationship between the position of AF movable part 11 and the position of AF movable part 11 calculated based on the AF hole output (hereinafter referred to as "first detection position"). Note that a value corrected such that the relationship illustrated in FIG. 13A has a linearity (a value after linearity correction described later) is used as the AF hole output. In FIG. 13B, L12 represents a first detection position in the case where OIS movable part 10 is located at the reference position, L22 represents the first detection position in the case where the displacement of OIS movable part 10 with respect to the reference position is 120 μm, and L32 represents the first detection position in the case where the displacement of OIS movable part 10 with respect to the reference position is 170 μm.

As illustrated in FIG. 13B, as the displacement of OIS movable part 10 increases, the deviation from first detection position L21 as the reference increases. Note that, as a result of the linearity correction performed such that the AF hole output characteristic has a linearity, the deviation is constant regardless of the position of AF movable part 11 when the displacement is the same. That is, when the displacement of OIS movable part 10 is the same, the same correction value can be used for correcting the deviation.

Figure 13C:
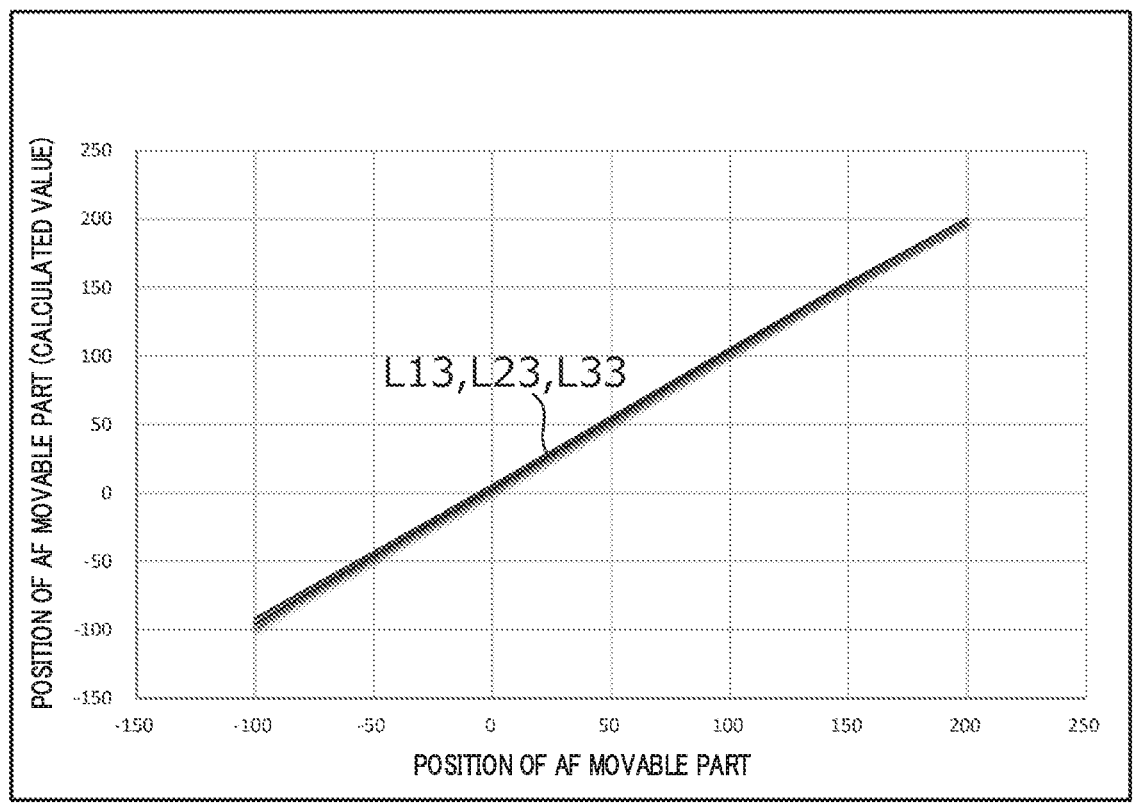

FIG. 13C illustrates a relationship between the position of AF movable part 11 and the position of AF movable part 11 calculated based on the displacement of AF hole output and OIS movable part 10 (hereinafter referred to as "second detection position"). In FIG. 13C, L13 represents the second detection position in the case where OIS movable part 10 is located at the reference position, L32 represents the second detection position in the case where the displacement of OIS movable part 10 with respect to the reference position is 120 μm, and L33 represents the second detection position in the case where the displacement of OIS movable part 10 with respect to the reference position is 170 μm.

As illustrated in FIG. 13C, the position of AF movable part 11 in the optical axis direction can be accurately calculated through the correction using the correction value obtained from FIG. 13B even when OIS movable part 10 is displaced. In this manner, the position of AF movable part 11 in the optical axis direction is calculated (at step S103 in FIG. 12).

Note that, strictly speaking, the position of AF movable part 11 in the optical axis direction varies due to sway of OIS movable part 10 in the XY plane. In particular, as in the present embodiment where suspension wire 30 couples OIS movable part 10 and OIS fixing part 20 and OIS movable part 10 is supported in a swayable manner, suspension wire 30 deflects when OIS movable part 10 sways, and OIS movable part 10 (AF movable part 11) comes closer to OIS fixing part 20. The positional variation of AF movable part 11 in the optical axis direction due to sway of OIS movable part 10 differs depending on the XY-position of OIS movable part 10.

In view of this, in the present embodiment, the AF hole output is corrected in consideration of the variation of the position of AF movable part 11 in the optical axis direction due to sway of OIS movable part 10. Generation (calibration) of correction data for correcting the AF hole output is described later.

At step S104 in FIG. 12, drive control part 200 determines whether the AF process has been completed by comparing the calculated position of AF movable part 11 in the optical axis direction and the position moved by the AF stroke. When the AF process has been completed (at step S104 "YES"), the process is advanced to step S105. When the AF process has not been completed (at step S104 "NO"), the process is advanced to step S103.

Specifically, in the AF process, a closed loop control based on the detection signal of OIS Hall devices 23A and 23B and AF Hall device 24 is performed. With the closed loop control method, it is not necessary to consider the hysteresis characteristics of the voice coil motor, and the stabilization of the position of AF movable part 11 can be directly detected. Accordingly, with high responsiveness, speedup of the AF operation can be achieved.

At step S105, drive control part 200 determines whether a capturing operation (e.g., a full press operation on the shutter button) has been performed at smartphone M. When a capturing operation has been performed (at step S105 "YES"), the imaging device (not illustrated) acquires a subject image, and the AF control process is terminated. Note that when defocus occurs before the capturing operation, the processes of steps S101 to S104 are again performed. In the above-mentioned manner, the AF control process is performed.

Note that, in the present embodiment, in a non-energization state where the AF process is not performed, AF movable part 11 is suspended between the infinity position and the macro position with upper springs 13A and 13B and lower spring 14 (hereinafter referred to as "reference state"). Specifically, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper springs 13A and 13B and lower spring 14.

In the AF process, the direction of the current is controlled based on whether AF movable part 11 is moved from the reference state toward the macro position side, or toward the infinity position side. In addition, the value of the current and/or the energization period is controlled in accordance with the movement length of AF movable part 11.

Figure 14:
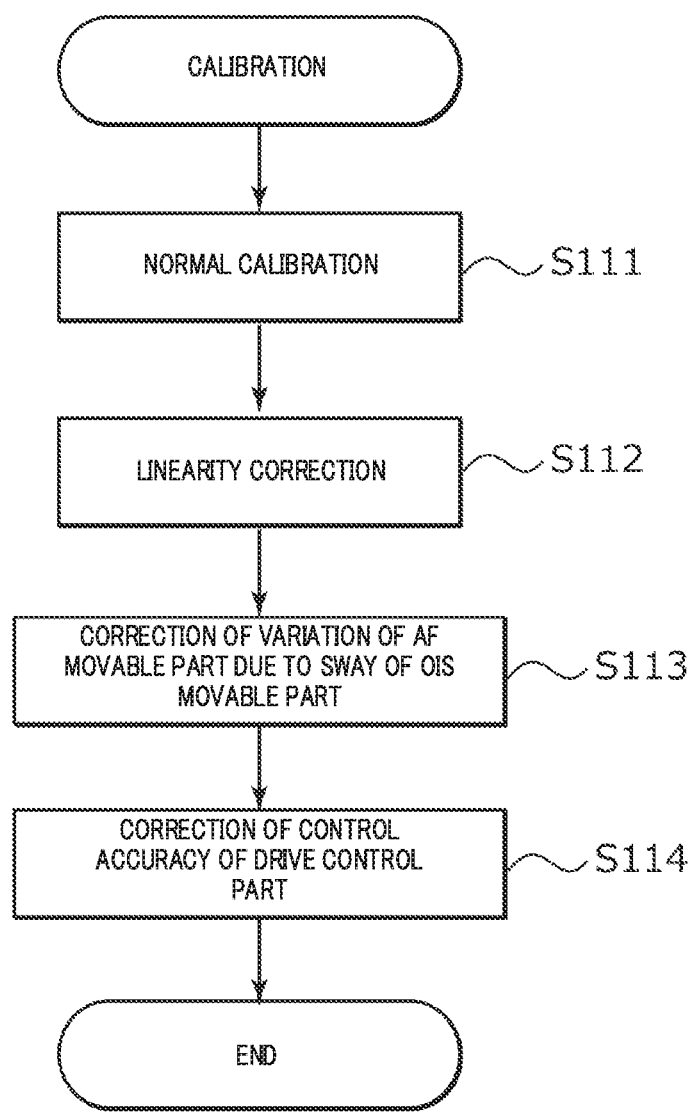
FIG. 14 is a flowchart of a calibration procedure of camera module A.

FIG. 14 is a flowchart of a calibration procedure of camera module A.

As illustrated in FIG. 14, first, calibration for the driving distance of the actuator is performed on the basis of the AF hole output in the movable range of AF movable part 11 in the optical axis direction (step S111).

Second, linearity correction of the AF hole output is performed (step S112).

Figure 15A:
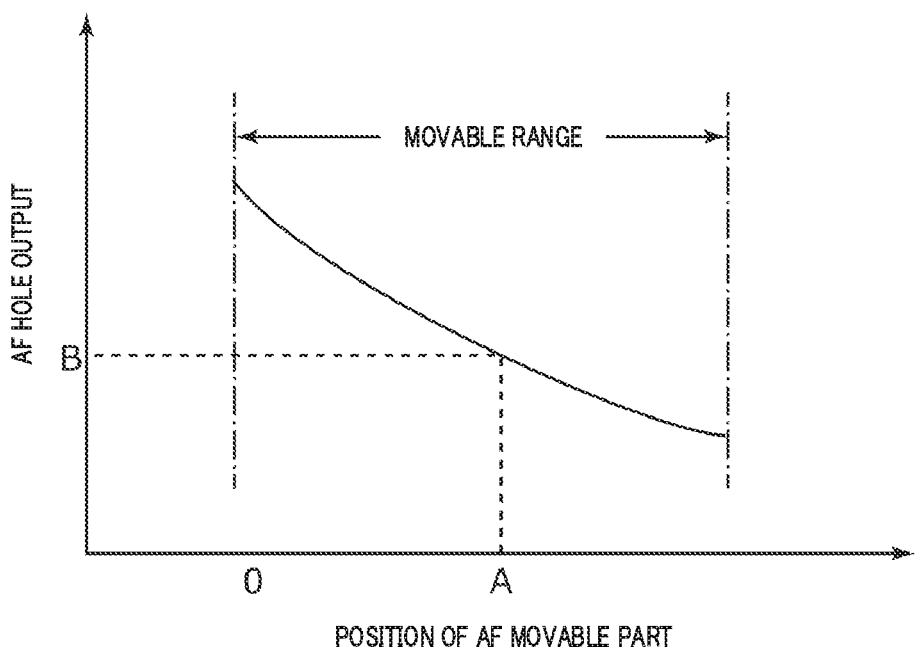
FIG. 15A and FIG. 15B are diagrams for description of linearity correction.

To be more specific, AF movable part 11 is moved in the optical axis direction without swaying OIS movable part 10, i.e., while maintaining the XY-position of OIS movable part 10 at the reference position, and the AF hole output and the position of AF movable part 11 in the optical axis direction in this state are measured. Then, approximation is performed such that the AF hole output has a linearity (see FIG. 15A). Note that the position of AF movable part 11 in the optical axis direction can be measured using a distance sensor such as a laser displacement measurement device and the like, for example.

Figure 15B:
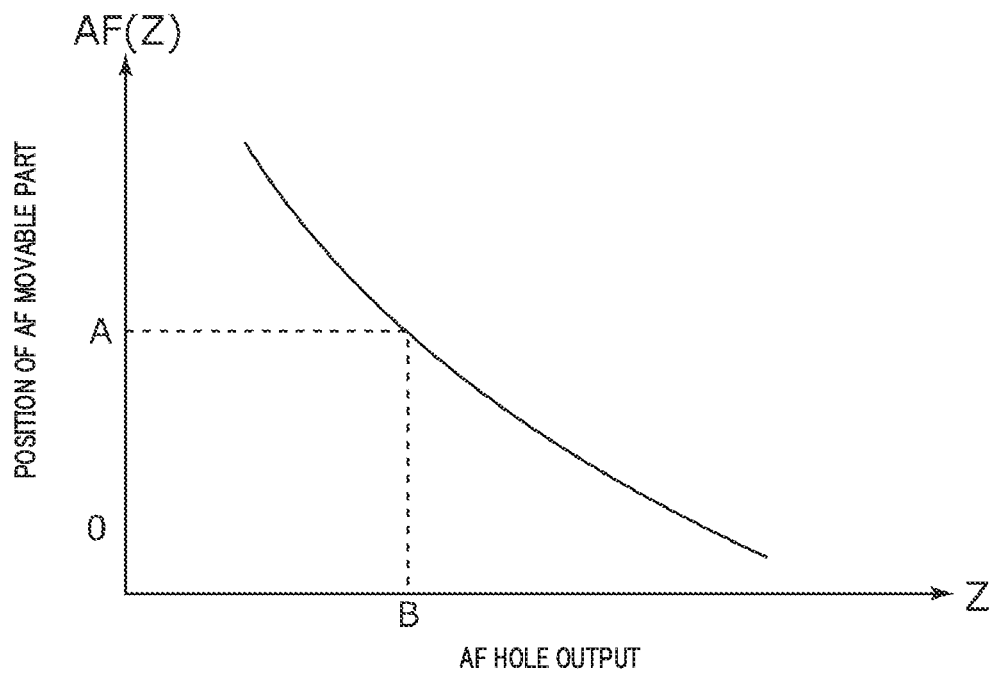

For example, approximation by a third-order curve is performed such that the AF hole output characteristic has a linearity in the movable range of AF movable part 11. With this configuration, a position AF(Z), which is the position of AF movable part 11 in the optical axis direction, is expressed as $$AF(Z)=aZ^3+bZ^2+cZ+d$$

where Z represents AF hole output (see FIG. 15B). AF(Z) is correction data for performing linearity correction, and represents the position of AF movable part 11 in the optical axis direction after linearity correction. a, b, c and d are all constants.

Third, correction of variation of AF movable part 11 due to sway of OIS movable part 10 is performed (step S113).

To be more specific, OIS movable part 10 is moved in the X direction and the Y direction in the state where AF coils 112A and 112B are not energized, and the position of AF movable part 11 in the optical axis direction in this state is measured. Then, for the X direction and the Y direction, functions of the amount of variation of AF movable part 11 due to sway of OIS movable part 10 are determined.

Figure 16:
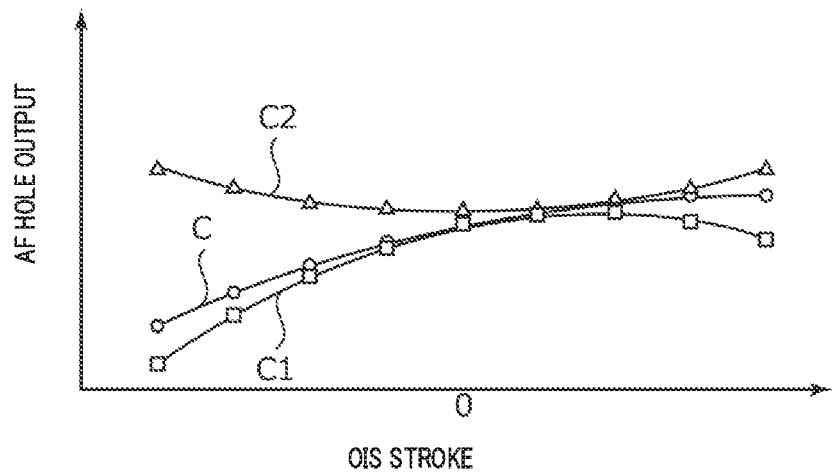
FIG. 16 illustrates an example of a simulation result of an AF hole output with respect to an OIS stroke when OIS movable part 10 is swayed.

FIG. 16 illustrates an exemplary simulation result of the AF hole output with respect to the OIS stroke when OIS movable part 10 is swayed. When OIS movable part 10 is swayed in the XY plane, the magnet-Hall device distance (the distance between Z-position detection magnet 113 and AF Hall device 24) varies, and accordingly the AF hole output varies (see curve C1 in FIG. 16). In addition, the position of AF movable part 11 in the optical axis direction varies as a result of deflection of suspension wire 30, and accordingly the AF hole output varies (see curve C2 in FIG. 16). Accordingly, as curve C (=C1+C2) indicates in FIG. 16, the two variation factors are reflected in the measurement result at step S113.

Figure 17:
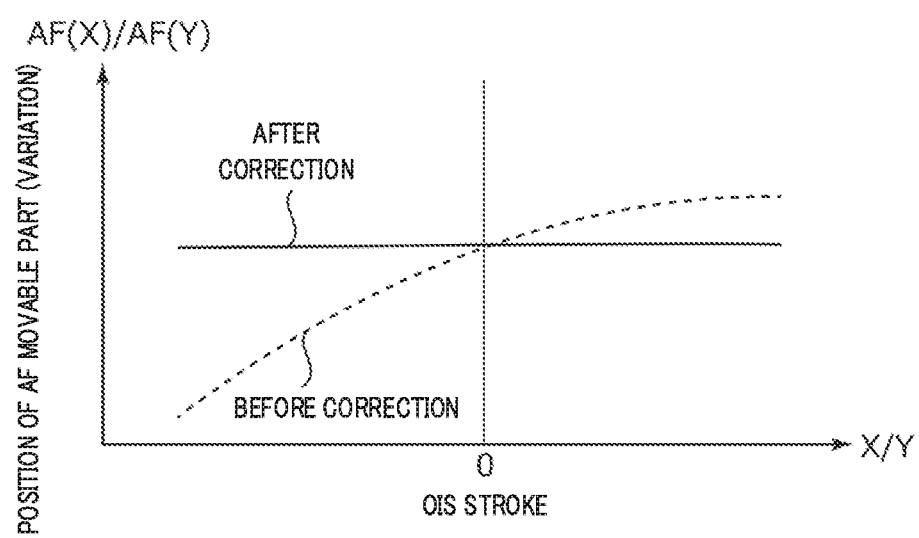
FIG. 17 illustrates an example of variation of the AF movable part due to sway of the OIS movable part.

FIG. 17 illustrates an example of the amount of variation of AF movable part 11 due to sway of OIS movable part 10. As illustrated in FIG. 17, the amount of variation of AF movable part 11 with respect to the OIS stroke in the X direction and the Y direction can be approximated by a secondary function.

Specifically, the amount of variation AF(X) and the amount of variation AF(Y) of AF movable part are expressed as $$AF(X)=fX^2+gX+h$$

$$AF(Y)=jY^2+kY+l$$

where X represents the OIS stroke in the case where OIS movable part 10 is swayed in the X direction, and Y represents OIS stroke in the case where OIS movable part 10 is swayed in the X direction the Y direction swayed. f, g, h, i, k and are all constants.

Note that, OIS stroke X in the X direction and OIS stroke Y in the Y direction are values based on the detection results of OIS Hall devices 23A and 23B. AF(X) and AF(Y) are correction data for correcting the positional variation of AF movable part 11 due 25 to sway of OIS movable part 10. By performing correction by adding AF(X) and AF(Y) to the position AF(Z) of AF movable part 11 calculated based on the AF hole output, the variation due to sway of OIS movable part 10 can be reflected.

Fourth, control accuracy correction of drive control part 200 is performed (step S114).

Figure 18:
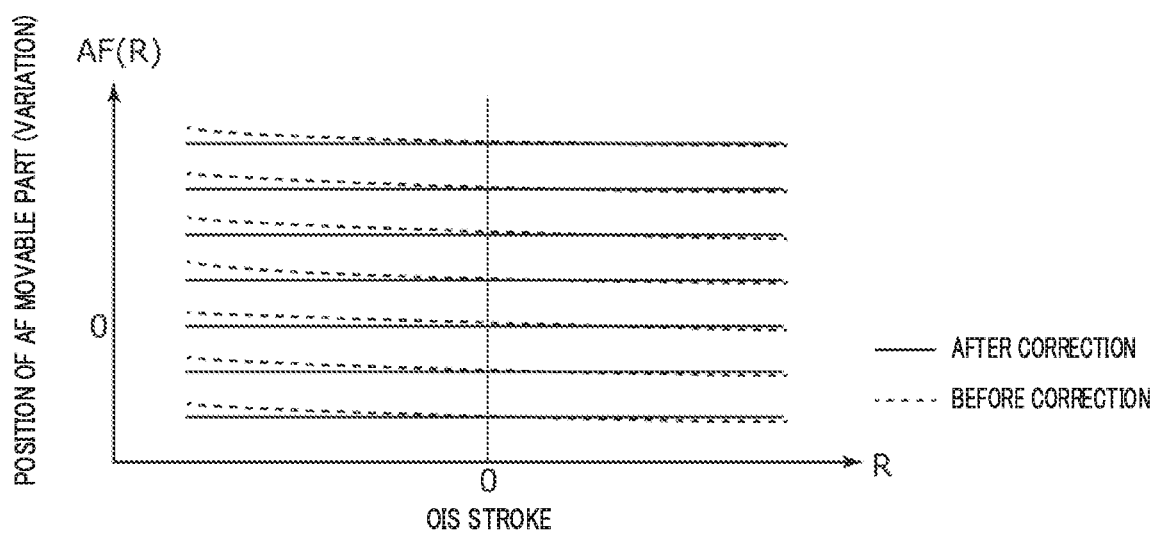
FIG. 18 is a diagram for description of error correction of a drive control by the drive control part.

To be more specific, AF movable part 11 is moved in the optical axis direction in the state where the XY-position of OIS movable part 10 is fixed at a predetermined position (X, Y), and the position of AF movable part 11 in the optical axis direction is measured. An error of the control accuracy of drive control part 200 is reflected in the measurement result (see FIG. 18). Then, a function of the amount of variation of AF movable part 11 due to the control accuracy error is determined. As illustrated in FIG. 18, for example, the amount AF(R) of variation of AF movable part 11 due to the control accuracy error depends on the OIS stroke (radius R about the reference position (R2=X2+Y2)). By performing correction by adding AF(R) to the position AF(Z) of AF movable part 11 calculated based on the AF hole output, the variation of AF movable part 11 due to a control error can be reflected.

In the above-mentioned manner, the position $AF_{TTL}$ of AF movable part 11 after the correction using the correction data is expressed as follows.

$$AF_{TTL}=AF(Z)+AF(X)+AF(Y)$$

$$AF(Z)=aZ^3+bZ^2+cZ+d$$

$$AF(X)=fX^2+gX+h$$

$$AF(Y)=iY^2+kY+l$$

Camera module A according to the embodiment includes an AF driving part, an OIS driving part, a first position detection part, a second position detection part and drive control part 200. The AF driving part includes AF movable part 11 (auto focus movable part) in which lens part 2 is disposed, and AF fixing part 12 (auto focus fixing part) disposed away from AF movable part 11. The AF driving part moves AF movable part 11 with respect to AF fixing part 12 in the optical axis direction. The OIS driving part includes OIS movable part 10 (shake correction movable part) including AF movable part 11 and AF fixing part 12, and OIS fixing part 20 disposed away from OIS movable part 10. The OIS driving part sways OIS movable part 10 with respect to OIS fixing part 20 in the optical axis orthogonal plane orthogonal to the optical axis direction. The first position detection part includes Z-position detection magnet 113 (position detection magnet) disposed in AF movable part 11, and AF Hall device 24 (Hall device) disposed opposite Z-position detection magnet 113 in the optical axis direction in OIS fixing part 20. The first position detection part (AF Hall device 24 and Z-position detection magnet 113) detects the position of AF movable part 11 in the optical axis direction. The second position detection part (OIS Hall devices 23A and 23B and driving magnets 122A and 123) detects the position of OIS movable part 10 in the optical axis orthogonal plane. Drive control part 200 performs driving control of the AF driving part on the basis of the detection results of the first position detection part and the second position detection part.

Drive control part 200 includes correction part 202 that corrects, in accordance with the preliminarily set correction data, the position of AF movable part 11 in the optical axis direction that is calculated based on the detection result of the first position detection part. Correction part 202 corrects the detection result of the first position detection part in consideration of displacement of AF movable part 11 in the optical axis direction due to sway of OIS movable part 10.

In addition, smartphone M (camera mounting apparatus) according to the embodiment is a camera mounting apparatus that is an information apparatus or a transport apparatus. Smartphone M includes camera module A, and an image processing part that processes image information obtained by camera module A.

In addition, the calibration method for camera module A according to the embodiment includes a first step and a second step. In the first step, the position of AF movable part 11 in the optical axis direction in the case where OIS movable part 10 is swayed in the optical axis orthogonal plane is measured, and the measurement result and the detection result of the first position detection part (AF Hall device 24 and Z-position detection magnet 113) are associated with each other. In the second step, correction data for correcting the detection result of the first position detection part is generated from the relationship between the measurement result obtained in the first step and the detection result of the first position detection part in consideration of displacement of AF movable part 11 in the optical axis direction due to sway of OIS movable part 10.

With this configuration, the configuration for detecting the position of AF movable part 11 in the optical axis direction can be simplified while ensuring the position detection accuracy. In addition, variation in quality (position detection accuracy) among modules can be reduced.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while a smartphone, which is a camera-equipped mobile terminal, is described as an example of a camera mounting apparatus including camera module A in the embodiment, the present invention is applicable to a camera mounting apparatus including a camera module and an image processing part configured to process image information obtained by the camera module. The camera mounting apparatus includes an information apparatus and a transport apparatus. The information apparatus includes, for example, a camera-equipped mobile phone, a note-type personal computer, a tablet terminal, a mobile game machine, a webcamera, and a camera-equipped in-vehicle apparatus (such as a rear-view monitor apparatus and a drive recorder apparatus). In addition, the transport apparatus includes, for example, an automobile.

Figure 19A:
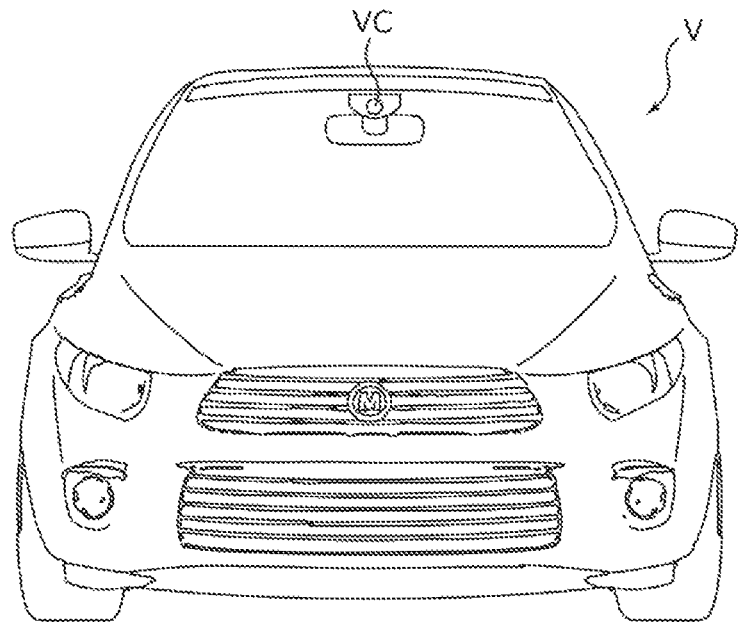
FIG. 19A and FIG. 19B illustrate an automobile as a camera mounting apparatus in which an in-vehicle camera module is mounted.
Figure 19B:
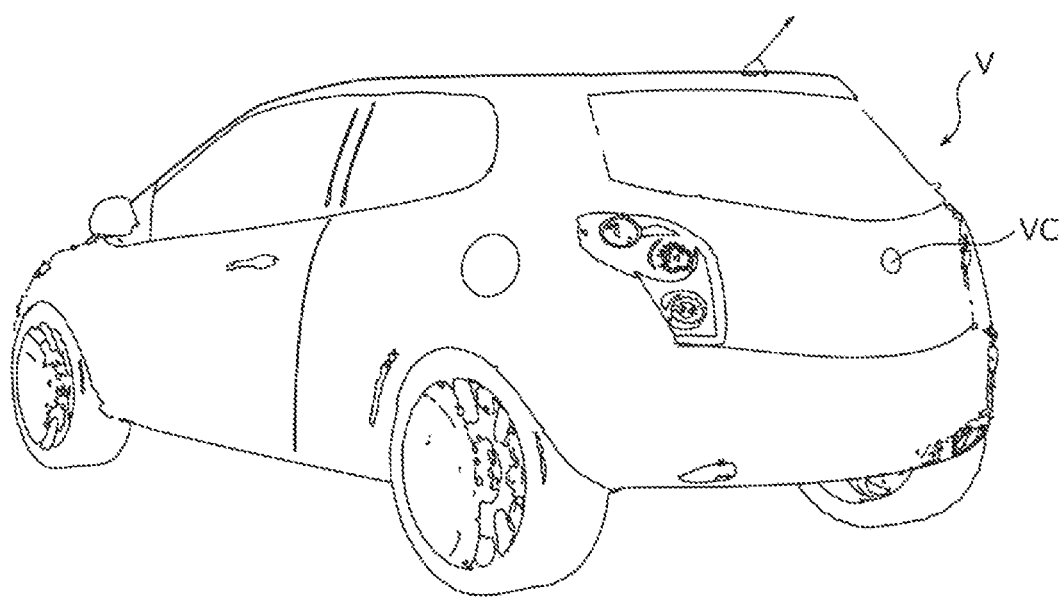

FIG. 19A and FIG. 19B illustrate automobile V serving as a camera mounting device in which an in-vehicle camera module vehicle camera (VC) is mounted. FIG. 19A is a front view of automobile V, and FIG. 19B is a rear perspective view of automobile V. In automobile V, camera module A described in the embodiment is mounted as in-vehicle camera module VC. As illustrated in FIG. 19A and FIG. 19B, in-vehicle camera module VC is attached to the windshield so as to face the front side, or attached to the rear gate so as to face the rear side, for example. This in-vehicle camera module VC is used for a rear-view monitor, a drive recorder, collision-prevention control, automatic operation control, and the like.

In addition, the present invention is applicable to a lens driving device in which an AF coil is disposed along the outer peripheral surface of a lens holder such that the coil surface is orthogonal to the optical axis direction, and a driving magnet is disposed around the AF coil. That is, the configurations of the AF voice coil motor and the OIS voice coil motor in the embodiment of the present invention are not limited to those illustrated in the embodiment.

In addition, an elastic support member composed of elastomer or the like, for example, may be applied as the OIS supporting part in place of suspension wire 30 described in the embodiment. In this case, power supply to the AF coil may be performed using a flexible printed circuit board and/or a litz wire.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

REFERENCE SIGNS LIST

1 Lens driving device
2 Lens part
3 Cover
10 OIS movable part (AF driving part)
11 AF movable part
12 AF fixing part
13 AF supporting part
13A, 13B Upper spring
14 AF supporting part, lower spring
20 OIS fixing part
21 Base
22 Coil substrate
23A, 23B OIS Hall device (Second position detection part)
24 AF Hall device (First position detection part)
30 OIS supporting member, Suspension wire
111 Lens holder
112A, 112B AF coil
113 Z-position detection magnet (First position detection part)
121 Magnet holder
122A Driving magnet (AF magnet serving also as OIS magnet, Second position detection part)
122B Driving magnet (AF magnet serving also as OIS magnet)
123 Driving magnet (OIS magnet, second position detection part)
124 Counter weight
221A, 221B, 222 OIS coil
200 Drive control part
201 Signal processing part
203 Correction part
M Smartphone
A Camera module

What is claimed is:
1. A camera module, comprising:
an auto-focusing driving part including an auto focus movable part in which a lens part is disposed, and an auto focus fixing part disposed away from the auto focus movable part, the auto-focusing driving part being configured to move the auto focus movable part with respect to the auto focus fixing part in an optical axis direction;

a shake-correcting driving part including a shake correction movable part and a shake correction fixing part disposed away from the shake correction movable part, the shake correction movable part including the auto focus movable part and the auto focus fixing part, the shake-correcting driving part being configured to sway the shake correction movable part with respect to the shake correction fixing part in an optical axis orthogonal plane orthogonal to the optical axis direction;

a first position detection part including a first position detection magnet disposed in the auto focus movable part, and a first Hall device disposed opposite the first position detection magnet in the optical axis direction in the shake correction fixing part, the first position detection part being configured to detect a position of the auto focus movable part in the optical axis direction;

a second position detection part including a second position detection magnet disposed in the shake correction movable part, and a second Hall device disposed opposite the second position detection magnet in the optical axis direction in the shake correction fixing part, the second position detection part being configured to detect a position of the shake correction movable part in the optical axis orthogonal plane; and a hardware processor configured to perform driving control of the auto-focusing driving part on a basis of a detection result of the first position detection part and a detection result of the second position detection part, wherein the hardware processor configured to correct, in accordance with preliminarily set correction data, the position of the auto focus movable part in the optical axis direction that is calculated based on the detection result of the first position detection part, and wherein the hardware processor corrects the detection result of the first position detection part in consideration of a displacement of the auto focus movable part in the optical axis direction due to sway of the shake correction movable part.

2. The camera module according to claim 1, wherein the hardware processor corrects the detection result of the first position detection part such that an output characteristic of the first Hall device has a linearity.

3. The camera module according to claim 1, wherein the hardware processor corrects the detection result of the first position detection part in consideration of a control accuracy error thereof.

4. The camera module according to claim 3, wherein a position $AF_{TTL}$ of the auto focus movable part in the optical axis direction after correction based on the preliminarily set correction data is expressed as $AF_{TTL}=AF(Z)+AF(X)+AF(Y)$, where $AF(Z)=aZ^3+bZ^2+cZ+d$, $AF(X)=fX^2+gX+h$, $AF(Y)=iY^2+kY+l$, where Z represents the detection result of the first position detection part, X and Y represent the detection result of the second position detection part, and a, b, c, d, f, g, h, i, k and l are all constants.

5. The camera module according to claim 1, wherein the first position detection magnet is a unipolar magnet, and is disposed such that a magnetization direction is aligned with the optical axis direction.

6. The camera module according to claim 5, wherein the first position detection magnet has a columnar shape.

7. The camera module according to claim 1, further comprising a shake correction supporting part configured to couple the shake correction movable part and the shake correction fixing part, and support the shake correction movable part in a swayable manner, wherein the shake correction supporting part includes a suspension wire.

8. A camera mounting apparatus that is an information apparatus or a transport apparatus, the camera mounting apparatus comprising:

the camera module according to claim 1.

9. A calibration method for a camera module, the camera module including:

an auto-focusing driving part including an auto focus movable part in which a lens part is disposed, and an auto focus fixing part disposed away from the auto focus movable part, the auto-focusing driving part being configured to move the auto focus movable part with respect to the auto focus fixing part in an optical axis direction;

a shake-correcting driving part including a shake correction movable part and a shake correction fixing part disposed away from the shake correction movable part, the shake correction movable part including the auto focus movable part and the auto focus fixing part, the shake-correcting driving part being configured to sway the shake correction movable part with respect to the shake correction fixing part in an optical axis orthogonal plane orthogonal to the optical axis direction;

a first position detection part including a first position detection magnet disposed in the auto focus movable part, and a first Hall device disposed opposite the position detection magnet in the optical axis direction in the shake correction fixing part, the first position detection part being configured to detect a position of the auto focus movable part in the optical axis direction;

a second position detection part including a second position detection magnet disposed in the shake correction movable part, and a second Hall device disposed opposite the second position detection magnet in the optical axis direction in the shake correction fixing part, the second position detection part being configured to detect a position of the shake correction movable part in the optical axis orthogonal plane; and a hardware processor configured to perform driving control of the auto-focusing driving part on a basis of a detection result of the first position detection part and a detection result of the second position detection part, the calibration method comprising:

measuring the position of the auto focus movable part in the optical axis direction when the shake correction movable part is swayed in the optical axis orthogonal plane and associating a result of the measuring with a detection result of the first position detection part, and generating correction data for correcting the detection result of the first position detection part in consideration of a displacement of the auto focus movable part in the optical axis direction due to sway of the shake correction movable part on a basis of a relationship between a result of the measuring and the detection result of the first position detection part.

* * * * *